US010079501B2

(12) United States Patent
Kudo et al.

(10) Patent No.: US 10,079,501 B2
(45) Date of Patent: Sep. 18, 2018

(54) BATTERY CONTROL DEVICE, BATTERY CONTROL SYSTEM, BATTERY CONTROL METHOD, AND RECORDING MEDIUM

(71) Applicant: NEC Corporation, Tokyo (JP)

(72) Inventors: Koji Kudo, Tokyo (JP); Hisato Sakuma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/374,958

(22) PCT Filed: Feb. 6, 2014

(86) PCT No.: PCT/JP2014/052767
§ 371 (c)(1),
(2) Date: Jul. 28, 2014

(87) PCT Pub. No.: WO2014/123189
PCT Pub. Date: Aug. 14, 2014

(65) Prior Publication Data
US 2016/0276859 A1    Sep. 22, 2016

(30) Foreign Application Priority Data

Feb. 8, 2013 (JP) .................................. 2013-023211

(51) Int. Cl.
H02J 7/00         (2006.01)
H02J 3/32         (2006.01)
(Continued)

(52) U.S. Cl.
CPC .............. H02J 7/0068 (2013.01); H02J 3/32 (2013.01); H02J 3/382 (2013.01); H02J 7/007 (2013.01);
(Continued)

(58) Field of Classification Search
CPC .. H02J 3/383; H02J 7/0068; H02J 3/32; H02J 3/382; H02J 7/0047; H02J 7/007; H02J 7/35
(Continued)

(56) References Cited

U.S. PATENT DOCUMENTS

2008/0212343 A1    9/2008 Lasseter et al.
2009/0295162 A1*  12/2009 Oohara .................. F03D 7/028
                                                           290/44
(Continued)

FOREIGN PATENT DOCUMENTS

EP    2 190 097 A1    5/2010
JP    2001-037085     2/2001
(Continued)

OTHER PUBLICATIONS

International Search Report and Written Opinion dated Apr. 1, 2014.
(Continued)

Primary Examiner — Drew A Dunn
Assistant Examiner — Zixuan Zhou
(74) Attorney, Agent, or Firm — Finnegan, Henderson, Farabow, Garrett & Dunner, L.L.P.

(57) ABSTRACT

A battery control device controlling an operation of a battery connected to a power system includes detection means that detects battery-related information showing a state of the battery, or a state of an interconnection point of the power system and the battery, first communication means that transmits a detection result of the detection means to an external device, and executes reception processing to receive operation control information to control the operation of the battery from the external device at a predetermined time interval, and control means that executes battery operation control processing to control the operation of the battery based on a state of the power system and based on
(Continued)

the operation control information received by the first communication means, at a time interval shorter than the predetermined time interval.

16 Claims, 16 Drawing Sheets

(51) Int. Cl.
*H02J 3/38* (2006.01)
*H02J 7/35* (2006.01)

(52) U.S. Cl.
CPC .............. *H02J 7/0047* (2013.01); *H02J 7/35* (2013.01); *H02J 2007/005* (2013.01); *Y02E 70/30* (2013.01)

(58) Field of Classification Search
USPC .......................................... 320/101; 290/50
See application file for complete search history.

(56) References Cited

U.S. PATENT DOCUMENTS

| 2010/0090532 A1* | 4/2010 | Shelton | H02J 3/32 307/46 |
|---|---|---|---|
| 2010/0174417 A1* | 7/2010 | Iida | H01M 10/425 700/292 |

FOREIGN PATENT DOCUMENTS

| JP | 2003-284244 | 10/2003 |
|---|---|---|
| JP | 2005-20916 | 1/2005 |
| JP | 2005-269744 | 9/2005 |
| JP | 2006-094648 | 4/2006 |
| JP | 2006-340539 | 12/2006 |
| JP | 2007-166860 | 6/2007 |
| JP | 2008-141926 | 6/2008 |
| JP | 2009-5529 | 1/2009 |
| JP | 2010-146571 | 7/2010 |
| JP | 2010-233353 | 10/2010 |
| JP | 2010-279133 | 12/2010 |
| JP | 2012-065432 | 3/2012 |
| JP | 2012-175778 | 9/2012 |
| JP | 2012-205436 | 10/2012 |
| JP | 2013-258806 | 12/2013 |
| WO | WO 2011-065498 | 6/2011 |
| WO | WO 2011-135822 | 11/2011 |
| WO | WO 2012/063800 A1 | 5/2012 |
| WO | WO 2013-157209 | 10/2013 |
| WO | WO 2013-172022 | 11/2013 |

OTHER PUBLICATIONS

M. Datta et al., "LFC by Coordinated Virtual Inertia Mimicking and PEVs in Power Utility with MW-class Distributed PV Generation", Control and Modeling for Power Electronics (COMPEL), IEEE $13^{13}$ Workshop, pp. 1-8, Jun. 2012.

K. Shimizu et al., "Load Frequency Control in Power System Using Vehicle-to-Grid System Considering the Customer Convenience of Electric Vehicles", Power System Technology (POWERCON), International Conference, pp. 1-8, Oct. 2010.

Extended European Search Report dated Sep. 20, 2016, by the European Patent Office in counterpart European Patent Application No. 14748744.1.

Notification of Reasons for Refusal dated Nov. 28, 2017, from the Japanese Patent Office in counterpart Japanese Patent Application No. 2014-547434.

Communication pursuant to Article 94(3) EPC from the European Patent Office in counterpart European Application No. 14748744.1, dated Nov. 29, 2017.

Decision to Grant dated Feb. 20, 2018, Issued by the Japanese Patent Office in counterpart Japanese Patent Application No. 2014-122360.

* cited by examiner

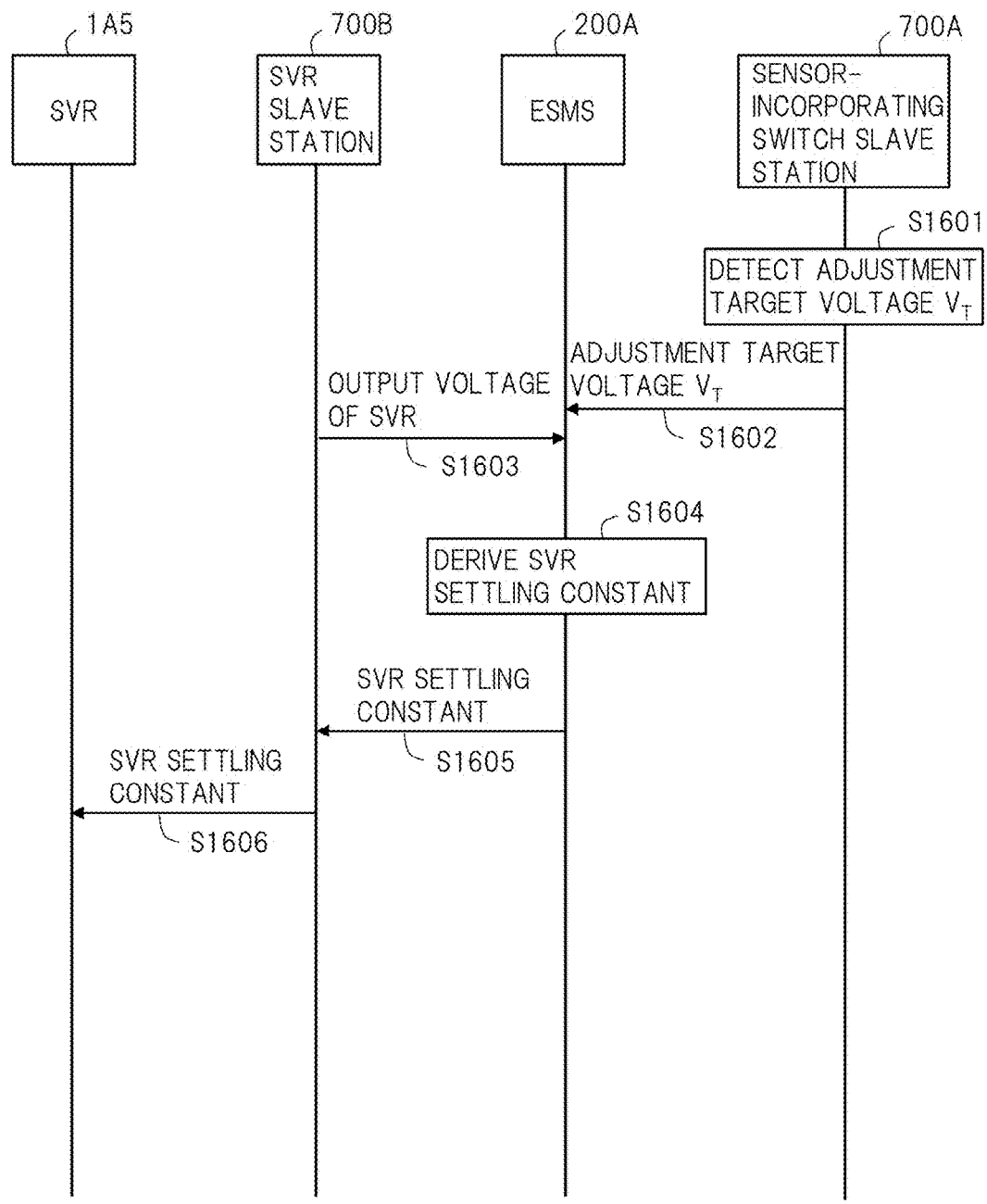

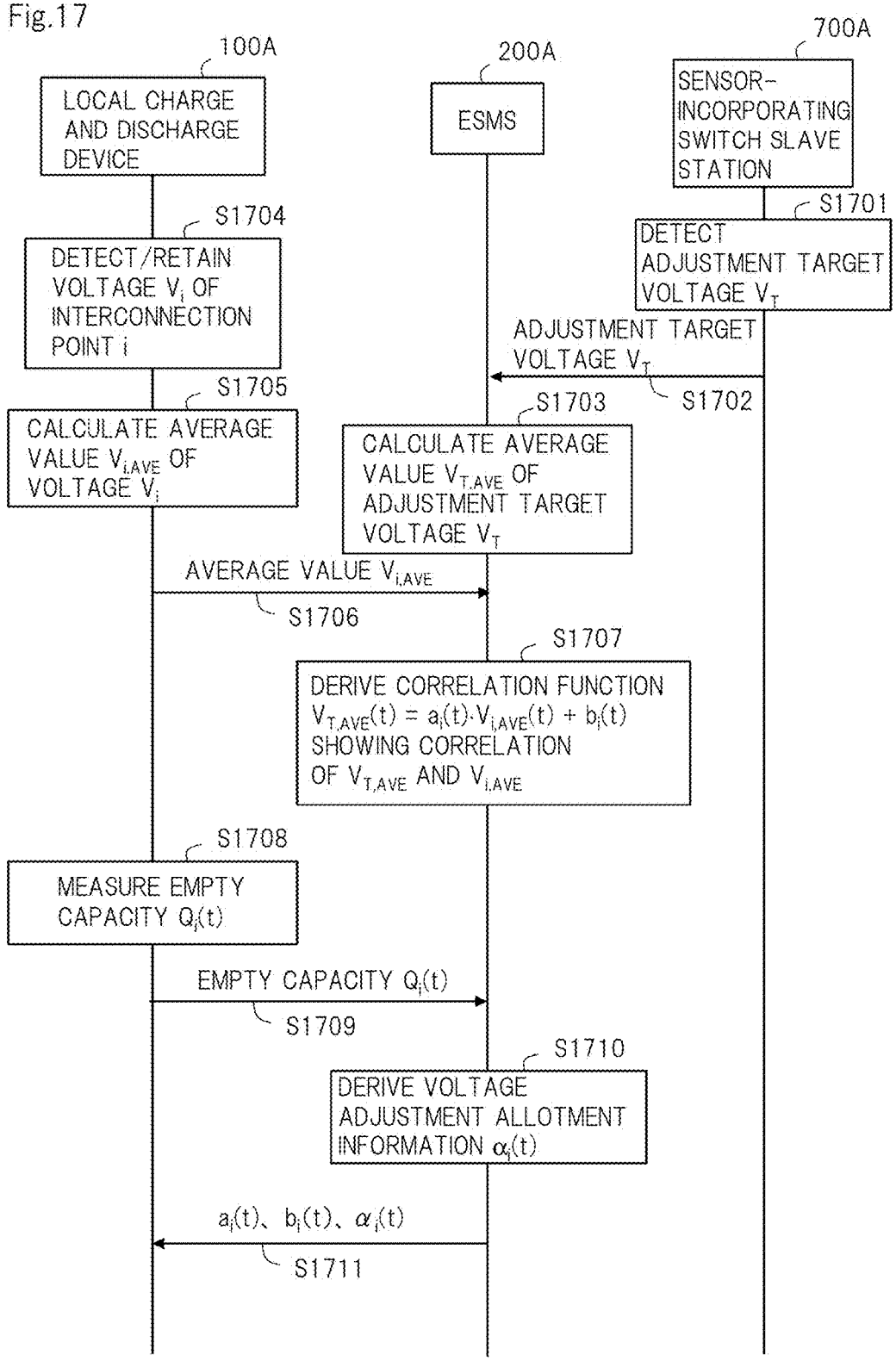

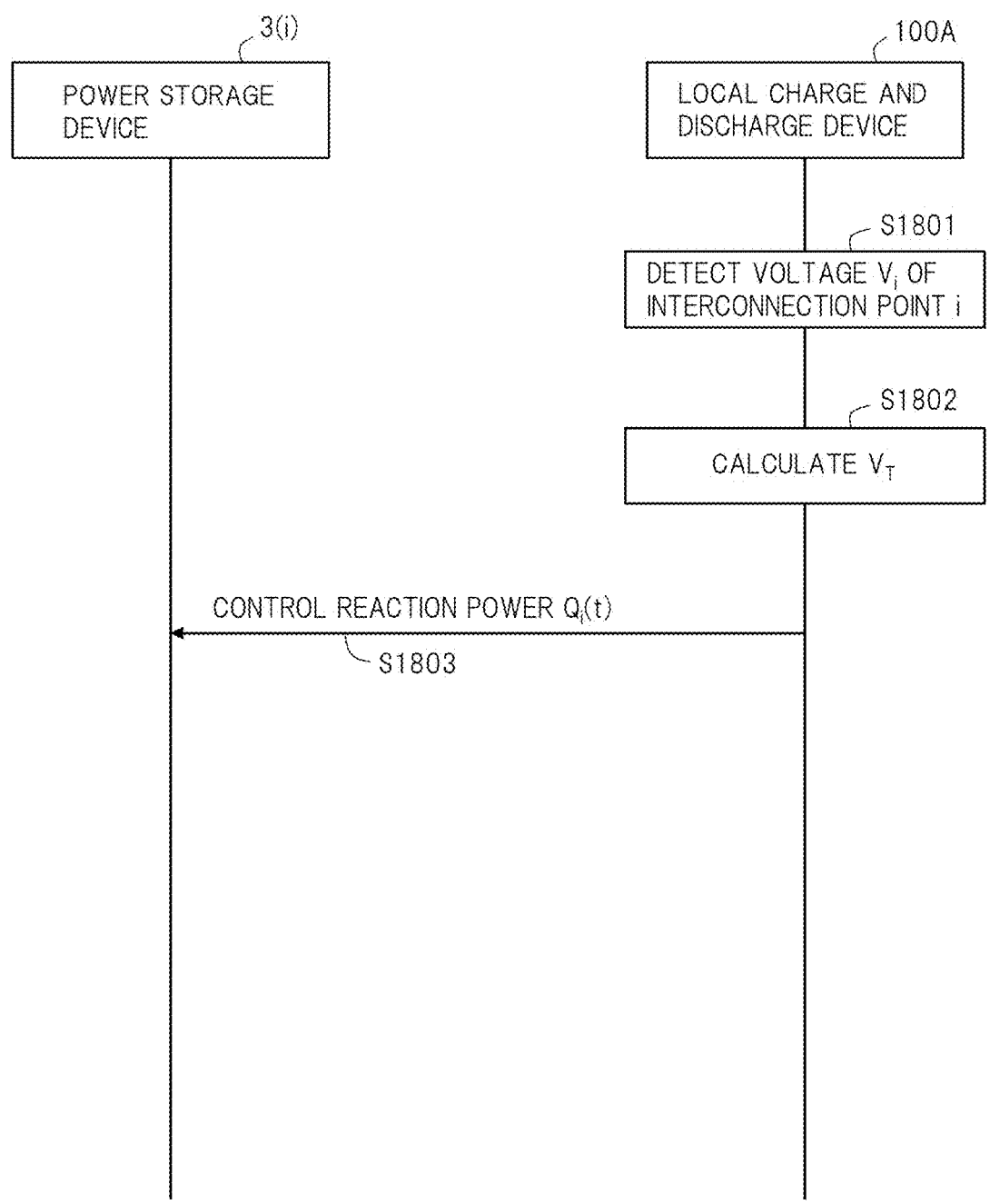

BATTERY CONTROL DEVICE, BATTERY CONTROL SYSTEM, BATTERY CONTROL METHOD, AND RECORDING MEDIUM

CROSS-REFERENCE TO RELATED PATENT APPLICATIONS

This application is a National Stage Entry of International Application No. PCT/JP2014/052767, filed Feb. 6, 2014, which claims priority from Japanese Patent Application No. 2013-023211, filed Feb. 8, 2013. The entire contents of the above-referenced applications are expressly incorporated herein by reference.

TECHNICAL FIELD

The present invention relates to a battery control system, a battery control device, a battery control method and a program, and particularly relates to a battery control system, a battery control device, a battery control method and a program that control discharge or charge of a battery connected to a power system.

BACKGROUND ART

In a power system, as a method for adjusting power demand and supply, a method has been adopted, which mainly uses the output control function of thermal power generation equipment of a thermal electric power plant, and properly combines an output adjustment function of pumping-up hydraulic power generation.

However, if renewable power sources, which are typified by photovoltaic power generation and wind power generation where the power generation amount depends on weather conditions, are connected to the a power system as distributed power sources, there may arise the situation in which output variations of the distributed power sources cause a greater loss of balance between power demand and supply than in the related art. As a result, in order to compensate for a variation in the balance of power demand and supply that is caused by the distributed power sources, the only method that is likely to be insufficient is the method that adjusts the balance of power demand and supply by mainly using thermal power generation equipment, as in the related art. Therefore, in addition to the related art, a more effective technology for adjusting the balance between power supply and demand is needed.

As one technology that can address this need to adjust the power demand and supply balance, there is a promising technology that uses distributed energy storage (hereinafter, an energy storage will be called "ES") such as "a storage battery" that interconnects to the distribution network of a power system, and is expected to come into widespread use from now on.

Patent Literature 1 describes a power system control method that adjusts power demand and supply by using a secondary battery (ES) in a consumer side.

In the power system control method described in Patent Literature 1, a power system control device acquires an amount of charge in a secondary battery, and further acquires a schedule of power supply to a power system that is generated based on a power demand forecast from a central power supply instruction office or the like. The power system control device determines an operation schedule of the secondary battery based on the amount of charge in the secondary battery and the power supply schedule.

When the power system control device determines the operation schedule of the secondary battery, the power system control device transmits the operation schedule to a secondary battery control system that controls the operation of the secondary battery.

When the secondary battery control system receives the operation schedule from the power system control device, the secondary battery control system controls charge and discharge of the secondary battery in accordance with the operation schedule, irrespective of the actual state of the power system.

Furthermore, Patent Literature 2 describes a system in which a central controller acquires state of charge information of a plurality of battery cells sampled at the same point of time via a local monitor and an upper controller.

CITATION LIST

Patent Literature

Patent Literature 1: JP2006-94648A
Patent Literature 2: JP2010-146571A

SUMMARY OF INVENTION

Technical Problem

The amount of power supplied from a renewable power source to a power system varies according to charges, over a short period of time, in the weather conditions. For example, in a photovoltaic power generation apparatus, the amount of power that is supplied varies as a result of small clouds that pass in front of the sun.

In practice, it is difficult to design a power supply schedule that can anticipate, over a short period of time, the degree of change in weather conditions.

Consequently, in the power system control method described in Patent Literature 1, it is difficult, in practice, to have the operation schedule (control information) of the secondary battery that is created by the power system control device that is an upper device, reflect changes, in the amount of supplied power, that will occur due to changes, over a short period of time, in weather conditions.

Accordingly, the power system control method described in Patent Literature 1 has the problem of being unable to cope with the actual variation state of the power system, in which the control information from the upper device is not reflected.

As one method for solving the above problem, it is conceivable that the power system control device, which is an upper device, can provide an operation schedule to the secondary battery control system at cycle TA when the secondary battery control system controls charge and discharge a secondary battery at cycle TA, for example.

However, if the communication cycle of the power system control device and the secondary battery control system becomes short, the communication is easily influenced by communication trouble that occurs in the communication network between the power system control device and the secondary battery control system. As a result, making the operation schedule available to the secondary battery control system becomes difficult, and a problem occurs in which precise operation control of the secondary battery becomes low.

Nor is the above problem solved, by the system described in Patent Literature 2 that does not control charge and discharge of a battery cell.

An object of the present invention is to provide a battery control system, a battery control device, a battery control method and a program that can solve the above described problem.

Solution to Problem

A battery control device according to the present invention is a battery control device controlling an operation of a battery connected to a power system, the device includes:

detection means that detects battery-related information that shows a state of the battery, or a state of an interconnection point of the power system and the battery;

first communication means that transmits a detection result of the detection means to an external device, and executes reception processing to receive operation control information to control the operation of the battery from the external device at a predetermined time interval; and control means that executes battery operation control processing to control the operation of the battery based on a state of the power system and based on the operation control information received by the first communication means, at a time interval shorter than the predetermined time interval.

A battery control system according to the present invention is a battery control system including a first control device that controls an operation of a battery connected to a power system, and a second control device that communicates with the first control device, wherein the first control device includes:

detection means that detects battery-related information that shows a state of the battery or a state of an interconnection point of the power system and the battery, first communication means that transmits a detection result of the detection means to the second control device, and executes reception processing to receive operation control information to control the operation of the battery from the second control device at a predetermined time interval, and control means that executes battery operation control processing of controlling the operation of the battery based on a state of the power system and based on the operation control information received by the first communication means at a time interval shorter than the predetermined time interval, and the second control device includes:

second communication means that communicates with the first control means, and receives the detection result of the detection means, recognition means that recognizes a situation of the power system, and processing means that generates the operation control information based on the detection result of detection means received by the second communication means, and based on the situation of the power system recognized by the recognition means, and transmits the operation control information from the second communication means to the first control device.

A battery control method according to the present invention is a battery control method that is performed by a battery control device that controls an operation of a battery connected to a power system, the method includes:

detecting battery-related information that shows a state of the battery, or a state of an interconnection point of the power system and the battery;

transmitting the battery-related information to an external device, and executing reception processing to receive operation control information to control the operation of the battery from the external device at a predetermined time interval; and executing battery operation control processing to control the operation of the battery based on a state of the power system and based on the operation control information at a time interval shorter than the predetermined time interval.

A battery control method according to the present invention is a battery control method that is performed by a battery control system including a first control device that controls an operation of a battery connected to a power system, and a second control device that communicates with the first control device, wherein the first control device detects battery-related information that shows a state of the battery, or a state of an interconnection point of the power system and the battery, the first control device transmits the battery-related information to the second control device, and executes reception processing to receive operation control information to control the operation of the battery from the second control device at a predetermined time interval, the first control device executes battery operation control processing to control the operation of the battery based on a state of the power system and based on the operation control information at a time interval shorter than the predetermined time interval, the second control device receives the battery-related information from the first control device, the second control device recognizes a situation of the power system, and the second control device generates the operation control information, based on the battery-related information and based on the situation of the power system, and transmits the operation control information to the first control device.

A recording medium according to the present invention is a computer-readable recording medium recording a program for causing a computer to execute:

a detection procedure of detecting battery-related information that shows a state of a battery connected to a power system, or a state of an interconnection point of the power system and the battery;

a communication procedure of transmitting the battery-related information to an external device, and executing reception processing to receive operation control information to control an operation of the battery from the external device at a predetermined time interval; and a control procedure of executing battery operation control processing to control the operation of the battery, based on a state of the power system and based on the operation control information at a time interval shorter than the predetermined time interval.

Advantageous Effect of Invention

According to the present invention, the time interval at which the first control device (the battery control device) acquires the operation control information from the second control device (the external device) is longer than the operation time interval at which the first control device carries out the battery operation control processing control the operation of the battery by using the operation control information. Therefore, as compared with the case where the time interval, at which the first control device acquires the operation control information, is the operation time interval at which the first control device carries out the battery operation control processing or shorter, the processing to acquire the operation control information is less influenced by a communication trouble that is likely to occur between the first control device and the second control device. In addition, the first control device controls the operation of the battery based on the operation control information provided from the second control device and based on the state of the power system, and thereby it becomes possible to adjust the operation of the battery in response to an actual change in the state of the power system while following the operation control information.

BRIEF DESCRIPTION OF DRAWINGS

FIG. 16 is a sequence diagram for explaining a setting operation.

FIG. 17 is a sequence diagram for explaining a generation operation.

FIG. 18 is a sequence diagram for explaining a power control operation.

DESCRIPTION OF EMBODIMENTS

Hereinafter, exemplary embodiments of the present invention will be described with reference to the drawings.

First Exemplary Embodiment

Figure 1:
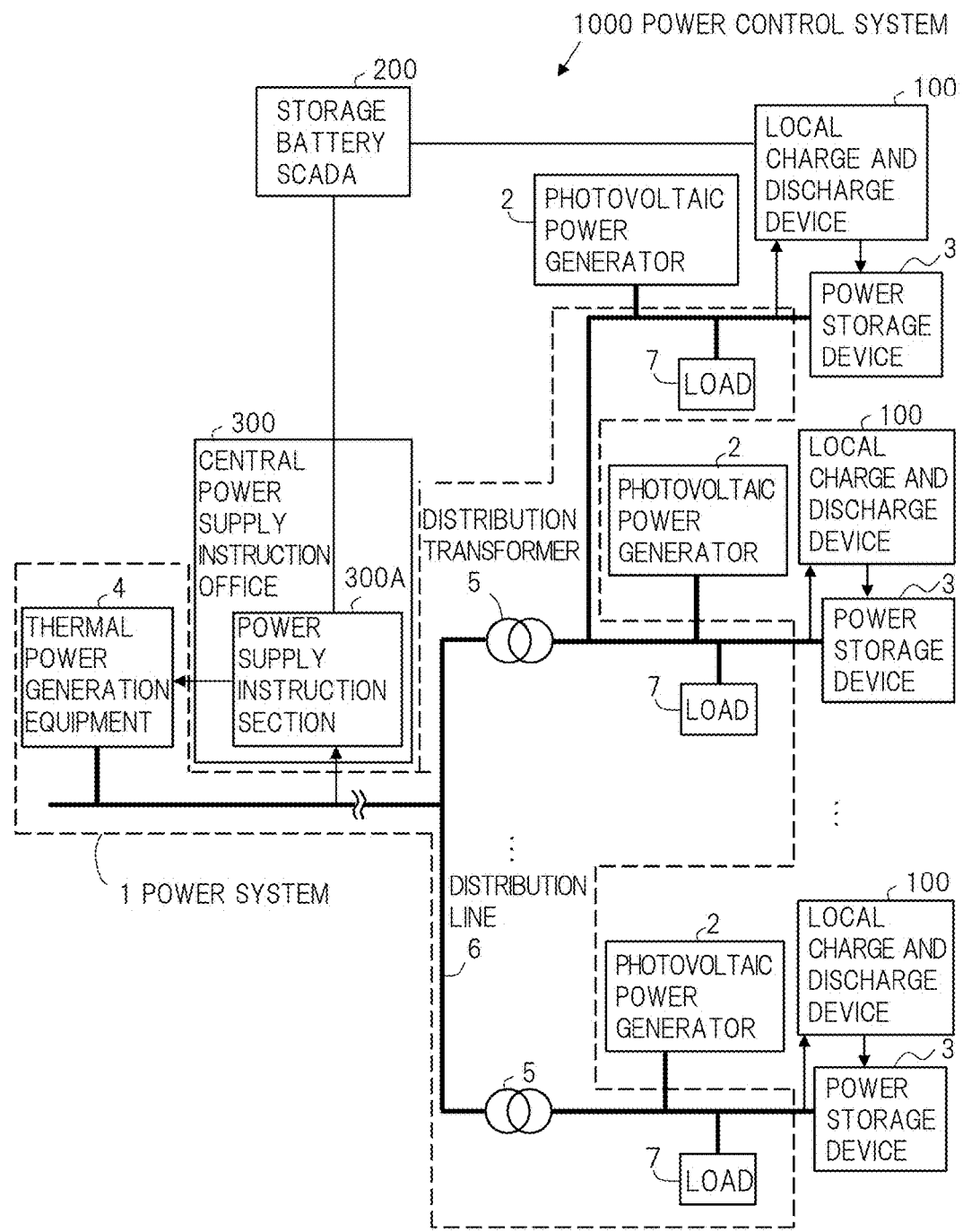
FIG. 1 is a diagram showing power control system 1000 that adopts a battery control system of a first exemplary embodiment of the present invention.

FIG. 1 is a diagram showing power control system 1000 that adopts a battery control system of a first exemplary embodiment of the present invention.

In FIG. 1, power control system 1000 includes power system 1, photovoltaic power generator 2, N (N is an integer that is 1 or larger) power storage devices 3, N local charge and discharge devices 100, storage battery SCADA (Supervisory Control And Data Acquisition) 200, and power supply instruction section 300A in central power supply instruction office 300. The power system 1 includes thermal power generation equipment 4, distribution transformer 5 and distribution line 6. Note that photovoltaic power generator 2 may be included in power system 1. The battery control system includes N of local charge and discharge devices 100, and storage battery SCADA 200.

Power control system 1000 limits variation in system frequency that result from changes in the amount of power generated by photovoltaic power generator 2, due to whether conditions, which is of concern to power system 1, to which photovoltaic power generator 2 is interconnected, by controlling a power generation operation of thermal power generation equipment 4 and charge and discharge operations of N of power storage devices 3.

Power system 1 is a system for supplying power to load 7 for use by consumers. Power system 1 also includes other devices (for example, a switch, an upper electric transformer, an SVR (Step Voltage Regulator) and a pole transformer), but for simplification of explanation, these devices are omitted.

Photovoltaic power generator 2 is an example of a renewable power source. The renewable power sources are not limited to a photovoltaic power generator and alternative renewable power sources can be used. For example, as the renewable power source, a wind power generator, a hydroelectric generator (including a small hydroelectric generator that generates power of 1,000 kilowatts or less), a geothermal power generator, or a power source in which these power generators coexist may be used.

Power storage device 3 is an example of a battery (a storage battery), and can be, for example, a lithium ion battery, a nickel-metal hydride battery, a sodium-sulfur battery, or a redox flow battery.

In the present exemplary embodiment, N power storage devices 3 are in one-to-one correspondence with N local charge and discharge devices 100. Power storage device 3 may be contained in corresponding local charge and discharge device 100, or does not have to be contained in corresponding local charge and discharge device 100. In the present exemplary embodiment, respective power storage devices 3 are contained in corresponding local charge and discharge devices 100 (see FIG. 2).

Respective local charge and discharge devices 100 control charge and discharge operations of corresponding power storage devices 3.

Storage battery SCADA 200 manages respective local charge and discharge devices 100 and respective power storage devices 3.

Power supply instruction section 300A adjusts a power generation operation of thermal power generation equipment 4, and charge and discharge operations of N of power storage devices 3, and thereby limits a variation in the system frequency.

Figure 2:
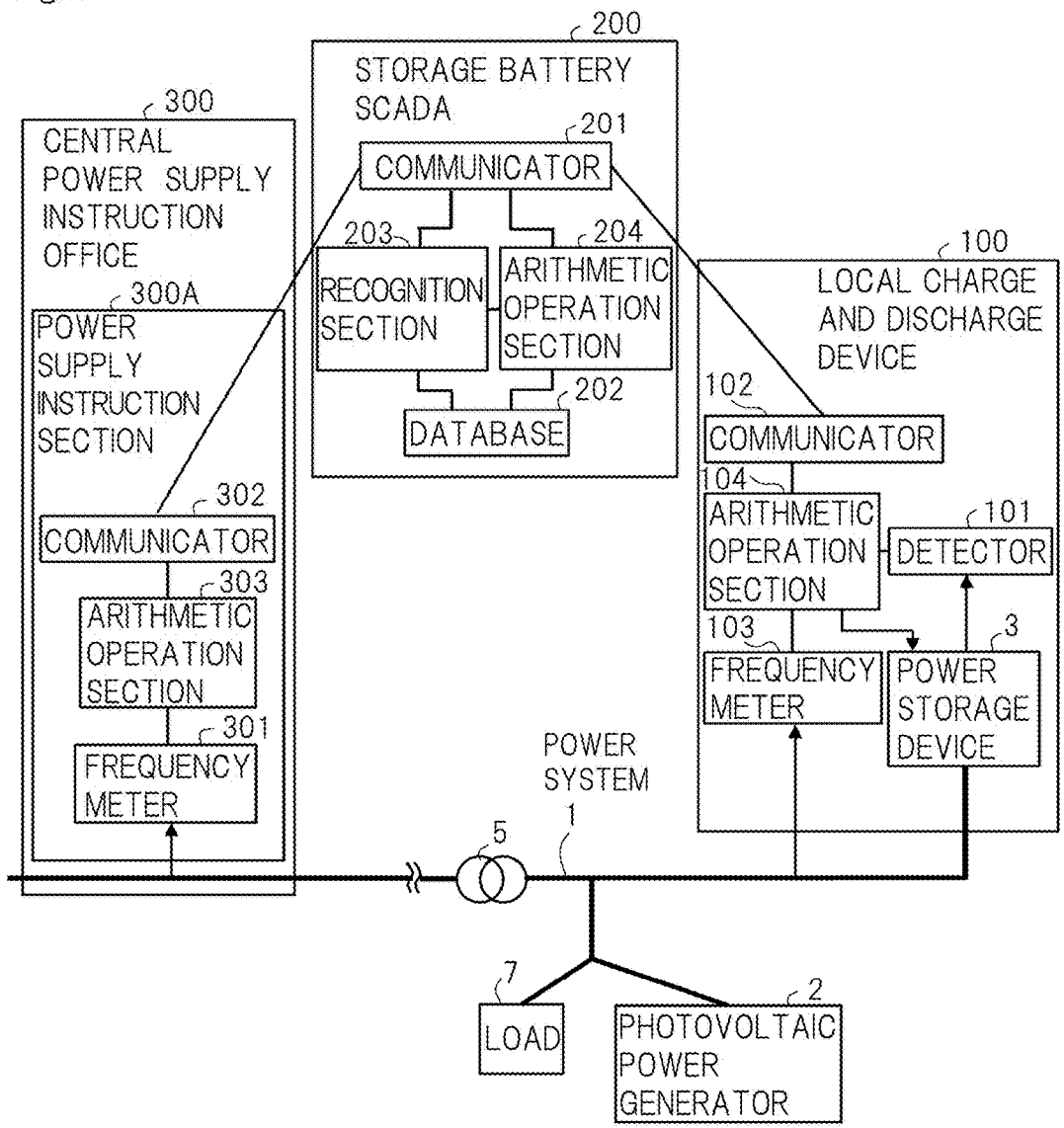
FIG. 2 is a diagram showing examples of local charge and discharge device 100, storage battery SCADA 200 and power supply instruction section 300A.

FIG. 2 is a diagram showing examples of local charge and discharge device 100, storage battery SCADA 200 and power supply instruction section 300A. In FIG. 2, those having the same configurations as those shown in FIG. 1 are assigned with the same reference signs. In order to simplify explanation, FIG. 2 shows one local charge and discharge device 100 containing one power storage device 3 among N of power storage devices 3 and N of local charge and discharge devices 100.

First, local charge and discharge device 100 will be described.

Local charge and discharge device 100 is an example of a first control device or a battery control device. Local charge and discharge device 100 controls an operation of power storage device 3 that is connected to power system 1. Local charge and discharge device 100 includes detector 101, communicator 102, frequency meter 103 and arithmetic operation section 104.

Detector 101 is an example of first detection means (detection means). Detector 101 detects SOC (State of Charge) of power storage device 3. The SOC of power storage device 3 takes a value within a range of 0 to 1. The SOC of power storage device 3 is an example of battery-related information that indicates a state of power storage device 3 or state information, or battery information for determining a chargeable and dischargeable capacity of power storage device 3. Note that the battery-related information, the state information and the battery information are not limited to the SOC of power storage device 3 and alternative information can be used. For example, a cell temperature, a current amount and a voltage of power storage device 3 may be used.

Communicator 102 is an example of first communicating means. Communicator 102 communicates with storage battery SCADA 200.

Frequency meter 103 is an example of second detection means. Frequency meter 103 detects a system frequency (a system frequency of power system 1). The system frequency varies in accordance with a power demand and supply balance state. The system frequency is an example of a state of the power system. Note that frequency meter 103 may be inside or outside local charge and discharge device 100.

Arithmetic operation section 104 is an example of control means.

Arithmetic operation section 104 executes an information acquiring operation (transmission and reception processing) of obtaining allotment information that shows allotment for controlling the balance between power demand and supply from storage battery SCADA 200, and a control operation (battery operation control processing) to control a charge and discharge operation of power storage device 3 by using the allotment information.

Note that the allotment information is information that relates to the charge and discharge operation of power storage device 3 and that is allotted to local charge and discharge device 100 and power storage device 3 in order to limit a variation in the system frequency.

Arithmetic operation section 104 repeatedly executes the information acquiring operation at time intervals, and repeatedly executes the control operation at time intervals shorter than the time intervals of the information acquiring operation.

For example, arithmetic operation section 104 repeatedly executes the information acquiring operation at periods T (for example, T=one minute), and repeatedly executes the control operation at periods $T_l$ (for example, $T_l$=0.1 seconds). Period T is an example of a predetermined time interval.

Note that period T and period $T_l$ are not limited to one minute and 0.1 seconds, and period T can be longer than period $T_l$.

Furthermore, both or any one of the operation time intervals of the information acquiring operation and the operation time interval of the control operation do not have to be fixed, and the shortest time among the respective operation time intervals of the information acquiring operation can be longer than the longest time among the respective operation time intervals of the control operation.

Furthermore, arithmetic operation section 104 may execute the information acquiring operation in response to the information request that requests SOC from storage battery SCADA 200, or may autonomously execute the information acquiring operation.

Here, the information acquiring operation of arithmetic operation section 104 will be described.

Arithmetic operation section 104 transmits the SOC of power storage device 3 detected by detector 101 to storage battery SCADA 200 from communicator 102, together with identification information (hereinafter, called "ID") of power storage device 3.

The ID is stored in each of local charge and discharge device 100 and storage battery SCADA 200. Storage battery SCADA 200 identifies power storage device 3, from which the SOC is reported, by using the ID transmitted with the SOC of power storage device 3.

Communicator 102 transmits the SOC and ID of power storage device 3 to storage battery SCADA 200, and thereafter receives allotment information from storage battery SCADA 200.

The allotment information is set in accordance with SOC of power storage device 3 and an imbalanced state of power demand and supply. In the present exemplary embodiment, as the allotment information, allotment coefficient K and maximum value $\Delta f_{max}$ of integral values of frequency deviations are used. Allotment coefficient K becomes larger as the allotment ratio to power storage device 3 becomes higher. Maximum value $\Delta_{fmax}$ of the integral values of the frequency deviations is used as a threshold value of the deviation amount of the system frequency with respect to the reference frequency (for example, 50 Hz). Note that the reference frequency of the system frequency is stored in arithmetic operation section 104.

Subsequently, the control operation of arithmetic operation section 104 will be described.

Arithmetic operation section 104 obtains integral value $\Delta f$ of a frequency deviation that is the deviation amount of the system frequency of power system 1 with respect to the reference frequency of the system frequency. Arithmetic operation section 104 controls the charge and discharge operation of power storage device 3 by using allotment coefficient K and integral value $\Delta f$ of the frequency deviation, when an absolute value of integral value $\Delta f$ of the frequency deviation is maximum value $\Delta f_{max}$ of the integral values of the frequency deviations, or smaller. Meanwhile, when the absolute value of integral value $\Delta f$ of the frequency deviation is larger than maximum value $\Delta f_{max}$ of the integral values of the frequency deviations, arithmetic operation section 104 controls the charge and discharge operation of power storage device 3 by using allotment coefficient K and maximum value $\Delta f_{max}$ of the integral values of the frequency deviations.

Next, storage battery SCADA 200 will be described.

Storage battery SCADA 200 is an example of a second control device or a battery control support device. Storage battery SCADA 200 has N of local charge and discharge devices 100 and N of power storage devices 3 under control. Storage battery SCADA 200 includes communicator 201, database 202, recognition section 203, and arithmetic operation section 204.

Communicator 201 is an example of second communication means. Communicator 201 communicates with respective local charge and discharge devices 100 and power supply instruction section 300A. For example, communicator 201 receives the SOC and ID of power storage device 3 from each of local charge and discharge devices 100.

Database 202 retains a storage battery distribution factor curve that is used to determine a chargeable and dischargeable capacity of power storage device 3 from the SOC of power storage device 3 received by communicator 201. Furthermore, database 202 also retains rated output P(n) of each of power storage devices 3 that is used to determine the chargeable and dischargeable capacity. Note that as rated output P(n) of power storage device 3, the rated output of an unillustrated power convertor (an AC/DC converter) that is connected to power storage device 3 is used.

Figure 3A:
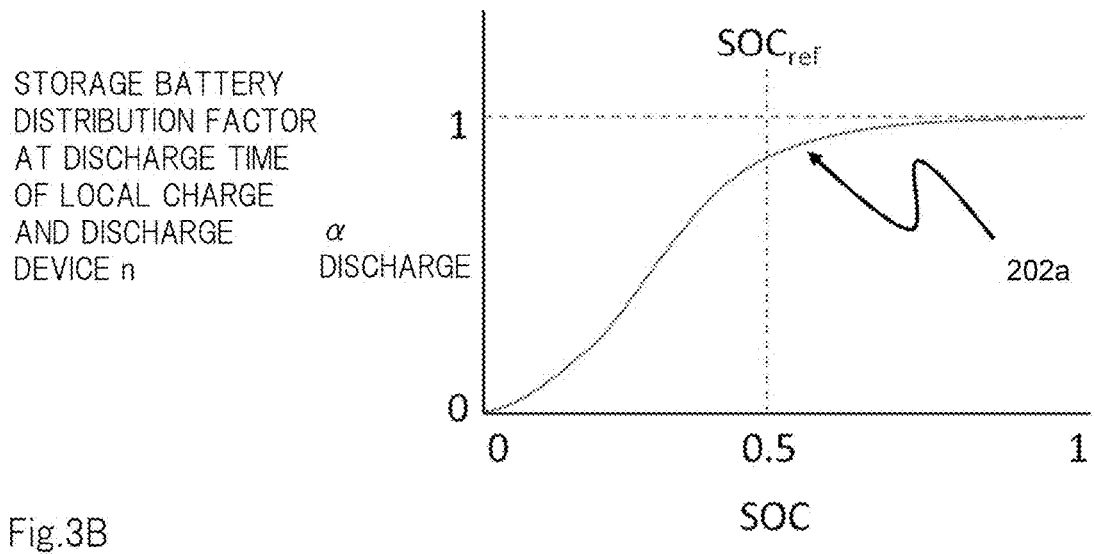
FIG. 3A is a diagram showing an example of a storage battery distribution factor curve.
Figure 3B:
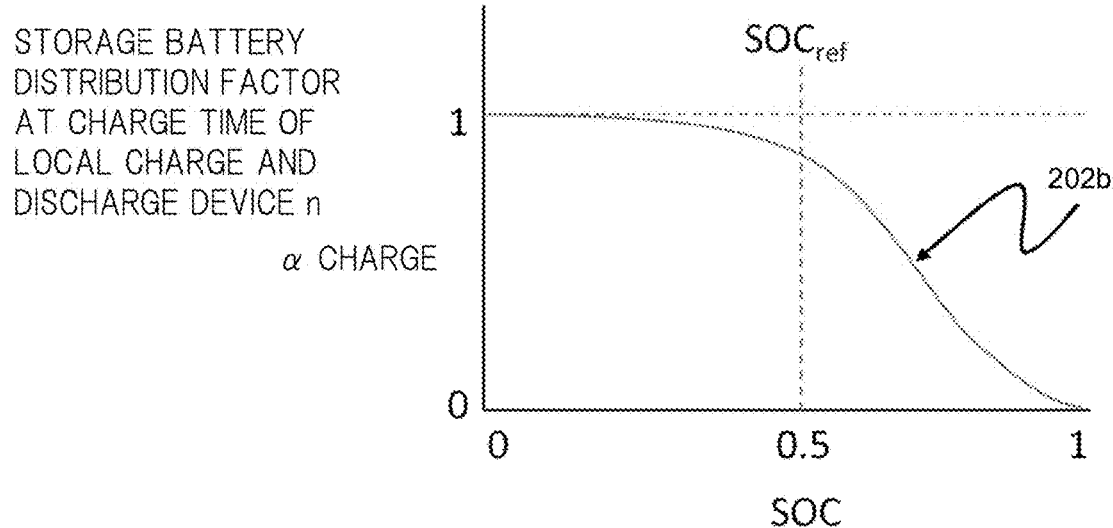
FIG. 3B is a diagram showing an example of the storage battery distribution factor curve.

FIGS. 3A and 3B each show an example of the storage battery distribution factor curve. FIG. 3A shows an example of storage battery distribution factor curve 202a at the time of discharge, and FIG. 3B shows an example of storage battery distribution factor curve 202b at the time of charge.

Recognition section 203 is an example of recognition means. Recognition section 203 recognizes power amounts (hereinafter, called "allotted power amounts") that are allotted to power storage devices 3 under control of storage battery SCADA 200 in order to adjust the power amount in power system 1. The allotted power amount is an example of a situation of the power system.

Recognition section 203 derives total adjustable capacity $P_{ES}$ showing the chargeable and dischargeable capacity of a storage battery group formed by N of power storage devices 3 from the SOC of N of power storage devices 3 by using the storage battery distribution factor curves in database 202. Total adjustable capacity $P_{ES}$ is an example of notification information.

Recognition section 203 transmits total adjustable capacity $P_{ES}$ to power supply instruction section 300A from communicator 201, and thereafter, receives allotted power amount information showing the allotted power amount reflecting total adjustable capacity $P_{ES}$ from power dispatching instruction section 300A via communicator 201. Recognition section 203 recognizes the allotted power amount in the allotted power amount information.

In the present exemplary embodiment, as the allotted power amount information, a charge and discharge gain line that shows the LFC (load frequency control) allotted capacity $LFC_{ES}$ that shows the maximum allotted power amount, and maximum value $\Delta f_{max}$ of the integral values of the frequency deviation are used.

Note that "the maximum value of the integral values of the frequency deviations" means "a maximum deflection amount of the integral value of the frequency deviation" that can be handled with the output amount of $LFC_{ES}$, with respect to the total output $LFC_{ES}$ of the number of storage batteries under control, and if the integral value becomes the maximum value or larger, handling with $LFC_{ES}$ becomes difficult.

Figure 4:
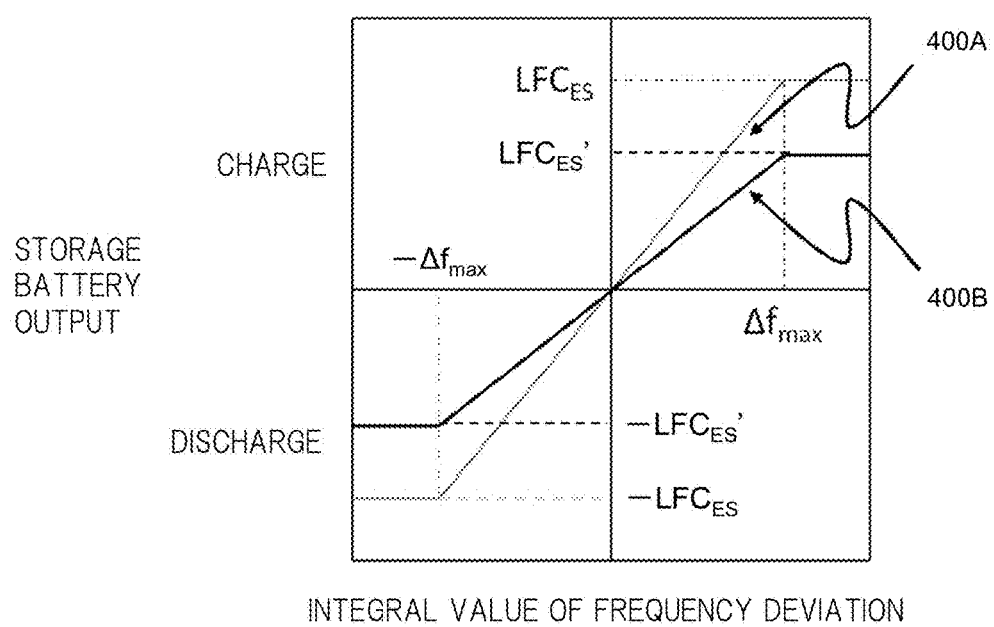
FIG. 4 is a diagram showing an example of a charge and discharge gain line.

FIG. 4 is a diagram showing an example of the charge and discharge gain line. Details of the charge and discharge gain line will be described later.

Arithmetic operation section 204 is an example of processing means. Arithmetic operation section 204 generates allotment information (allotment coefficient K and maximum value $\Delta f_{max}$ of the integral values of frequency deviations) based on the SOC of power storage device 3 received by communicator 201, and the charge and discharge gain line recognized by recognition section 203. Arithmetic operation section 204 transmits the allotment information (allotment coefficient K and maximum value $\Delta f_{max}$ of the integral values of the frequency deviations) to respective local charge and discharge devices 100 from communicator 201.

Next, power supply instruction section 300A will be described.

Power supply instruction section 300A is an example of an external control device. Power supply instruction section 300A includes frequency meter 301, communicator 302 and arithmetic operation section 303.

Frequency meter 301 detects a system frequency of power system 1.

Communicator 302 communicates with storage battery SCADA 200. For example, communicator 302 receives total adjustable capacity $P_{ES}$ from storage battery SCADA 200.

Arithmetic operation section 303 controls the operation of power supply instruction section 300A.

For example, arithmetic operation section 303 calculates area requirement (Area Requirement: AR) that is an output correction amount of a power station by using the system frequency detected by frequency meter 301. Arithmetic operation section 303 derives the LFC capacity by using area requirement AR, the LFC adjustment capacity of thermal power generation equipment 4 that is to be a control target, and total adjustable capacity $P_{ES}$ of the storage battery group that is to be a control target. Arithmetic operation section 303 acquires the LFC adjustment capacity of thermal power generation equipment 4 from a thermal power generation equipment control section not illustrated, and total adjustable capacity $P_{ES}$ is supplied to arithmetic operation section 303 from communicator 302.

Arithmetic operation section 303 assigns a capacity from which an abrupt variation component is excluded out of the LFC capacity to thermal power generation equipment 4, and assigns remaining LFC capacity $LFC_{ES}$ (note that $LFC_{ES} \leq P_{ES}$) to the storage battery group. For example, arithmetic operation section 303 extracts the abrupt variation component (capacity $LFC_{ES}$) from the LFC capacity by using a high pass filter that passes only variation components with periods of 10 seconds or shorter among the LFC capacities.

Arithmetic operation section 303 deals capacity $LFC_{ES}$ as LFC assignment capacity $LFC_{ES}$, and generates a charge and discharge gain line (see FIG. 4) that shows LFC assignment capacity $LFC_{ES}$, and maximum value $\Delta f_{max}$ of the integral values of the frequency deviations that are fixed in advance.

Arithmetic operation section 303 transmits the charge and discharge gain line to storage battery SCADA 200 from communicator 302.

Next, outlines of operations will be described.

(1) Storage battery SCADA 200 accepts SOC of each of power storage devices 3 to be a control target from each of local charge and discharge devices 100 at periods T, and thereby collects SOC of each of power storage devices 3. Period T is approximately one minute.

(2) Storage battery SCADA 200 derives total adjustable capacity $P_{ES}$ based on the SOC of each of power storage devices 3 each time storage battery SCADA 200 collects SOC of each of power storage devices 3.

(3) Subsequently, storage battery SCADA 200 transmits total adjustable capacity $P_{ES}$ to power supply instruction section 300A at periods $T_m$. Period $T_m$ is period T or more, and is four minutes, for example.

(4) Power dispatching instruction section 300A calculates LFC allotment capacity $LFC_{ES}$ ($LFC_{ES} \leq P_{ES}$) with respect to a power storage device 3 group that is controlled by storage battery SCADA 200, each time that power supply instruction section 300A receives total adjustable capacity $P_{ES}$.

(5) Power dispatching instruction section 300A creates a charge and discharge gain line by using LFC assignment capacity $LFC_{ES}$ and maximum value $\Delta f_{max}$ of the integral values of the frequency deviations, each time that power supply instruction section 300A calculates LFC assignment capacity $LFC_{ES}$, and transmits the charge and discharge gain line to storage battery SCADA 200.

(6) Storage battery SCADA 200 calculates allotment coefficient K in accordance with the newest charge and discharge gain line from power supply instruction section 300A.

(7) Subsequently, storage battery SCADA 200 transmits allotment information (allotment coefficient K and maximum value $\Delta f_{max}$ of the integral values of frequency deviations) to each of local charge and discharge devices 100 at periods T.

(8) Each of local charge and discharge devices 100 calculates a local charge and discharge gain line that defines the charge and discharge operation of power storage device 3, based on allotment coefficient K and maximum value $\Delta f_{max}$ of the integral values of the frequency deviations. The local charge and discharge gain line will be described later.

(9) Each of local charge and discharge devices 100 controls the charge and discharge operation of power storage device 3 by using the local charge and discharge gain line and the system frequency.

Next, details of the operations will be described.

First, an operation of storage battery SCADA 200 deriving total adjustable capacity $P_{ES}$ based on SOC of power storage device 3 (hereinafter, called a "$P_{ES}$ deriving operation") will be described. Note that in order to derive total adjustable capacity $P_{ES}$, information of rated output P(n) and the like of the storage battery of each ID (the kWh of the battery, the usable SOC range, for example, the range of 30% to 90% and the like) is needed. The information thereof is basically stationary information, and therefore, in the present exemplary embodiment, storage battery SCADA 200 is assumed to acquire the information thereof from each of local charge and discharge devices 100 in advance.

Figure 5:
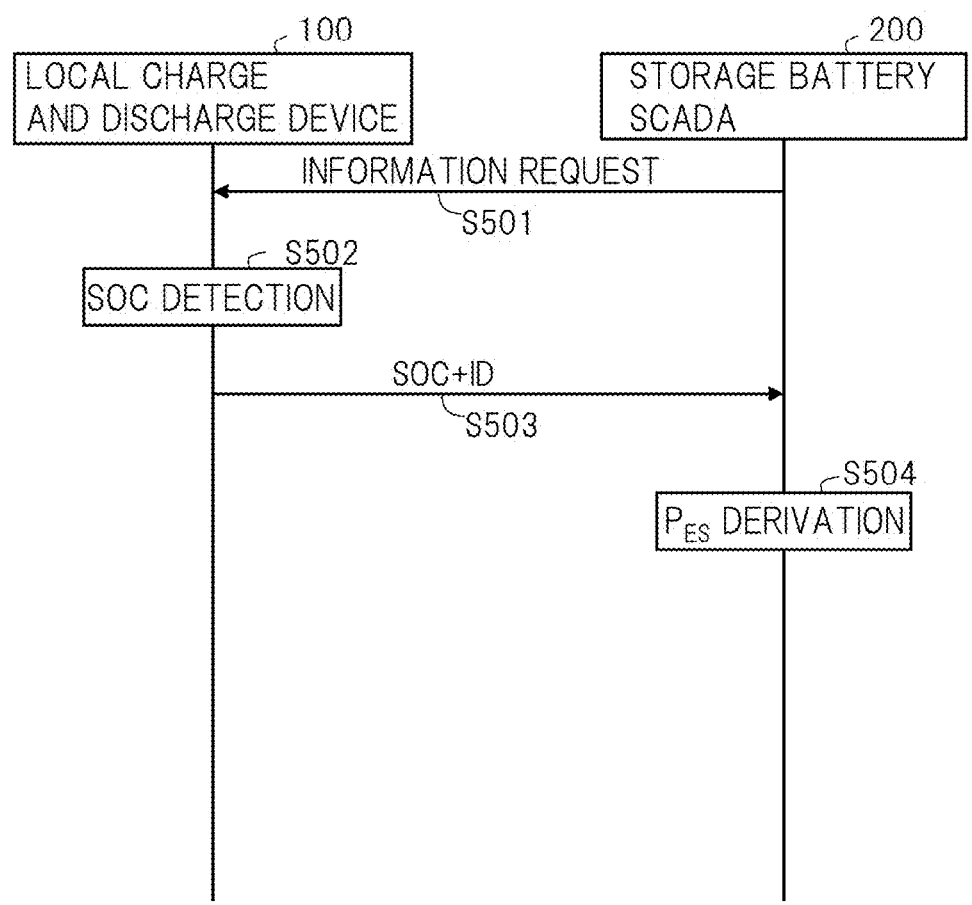
FIG. 5 is a sequence diagram for explaining a $P_{ES}$ derivation operation.

FIG. 5 is a sequence diagram for explaining the $P_{ES}$ deriving operation. In FIG. 5, the number of local charge and discharge devices 100 is set at one to simplify explanation.

Communicator 201 of storage battery SCADA 200 transmits an information request that requests SOC from each of local charge and discharge devices 100 (step S501).

In each of local charge and discharge devices 100, arithmetic operation section 104 causes detector 101 to detect SOC of power storage device 3 when arithmetic operation section 104 receives the information request requesting SOC via communicator 102 (step S502).

Subsequently, arithmetic operation section 104 transmits SOC detected by detector 101 together with ID, to storage battery SCADA 200 from communicator 102 (step S503).

Hereinafter, explanation will be made with ID being assumed to be a consecutive number (n) from "1" to "N".

When storage battery SCADA 200 receives SOC (hereinafter, called "SOC(n)") that is assigned with ID from each of local charge and discharge devices 100, storage battery SCADA 200 derives total adjustable capacity $P_{ES}$ (step S504).

Storage battery SCADA 200 and each of local charge and discharge devices 100 repeat the operation of steps S501 to S504, namely, the $P_{ES}$ deriving operation at periods T.

Next, a method for deriving total adjustable capacity $P_{ES}$ will be described.

Communicator 201 of storage battery SCADA 200 collects real-time SOC(n) from each of local charge and discharge devices 100.

Subsequently, recognition section 203 of storage battery SCADA 200 derives storage battery distribution factor α discharge (n) at the time of discharge and storage battery distribution factor α charge (n) at the time of charge, for each of power storage devices 3, by using SOC(n) and storage battery distribution factor curves 202a and 202b (see FIGS. 3A and 3B) that are retained in database 202.

Here, as the storage battery distribution factor curves shown in FIGS. 3A and 3B, curves with an objective of basically keeping SOC at approximately 50% at the time of charge and at the time of discharge are used. Note that the storage battery distribution factor curves are properly changeable without being limited to the storage battery distribution factor curves shown in FIGS. 3A and 3B.

Subsequently, recognition section 203 derives $P_{ES,discharge}$ and $P_{ES,charge}$ by using storage battery distribution factor α discharge (n) at the time of discharge, storage battery distribution factor α charge (n) at the time of charge, respective rated outputs P(n) of N of power storage devices 3 in total, and formulas shown in formula 1 and formula 2.

$$P_{ES,clscharge} = \sum_{n=1}^{N} \alpha_{discharge}(n) \cdot P(n) \qquad \text{[Formula 1]}$$

$$P_{ES,charge} = \sum_{n=1}^{N} \alpha_{charge}(n) \cdot P(n) \qquad \text{[Formula 2]}$$

Subsequently, recognition section 203 adopts a smaller value out of $P_{ES,discharge}$ and $P_{ES,charge}$, as total adjustable capacity $P_{ES}$. This is because in order to adjust the system frequency, charge and discharge in power storage device 3 is required with about the same frequency, and the total adjustable capacity with which both charge and discharge can be performed is needed. Note that the total adjustable capacity is the value with which charge and discharge are considered to be able to be continued at least during the time period of period T.

Next, an operation of storage battery SCADA 200 communicating with power supply instruction section 300A and recognizing a charge and discharge gain line (hereinafter, called a "recognition operation") will be described.

Figure 6:
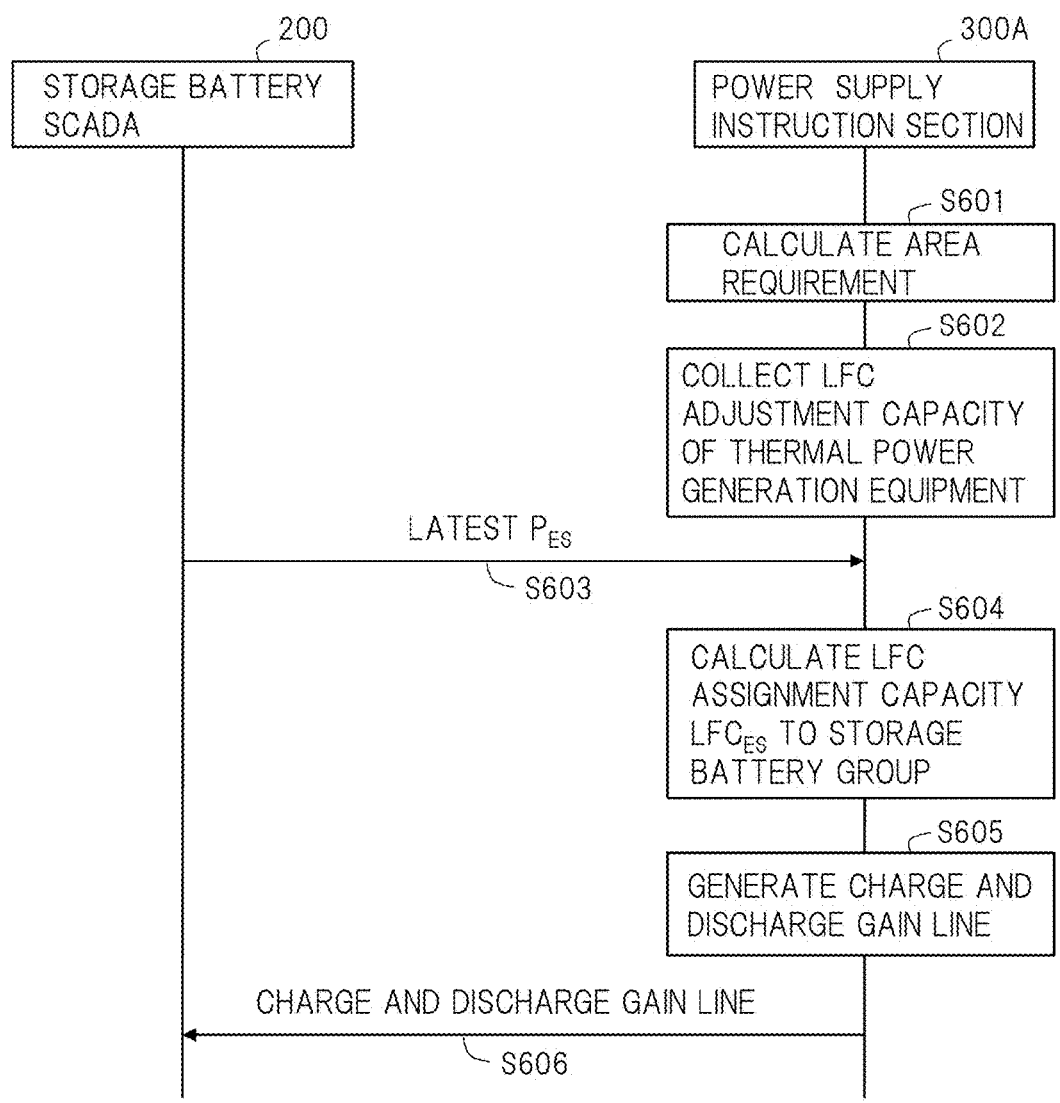
FIG. 6 is a sequence diagram for explaining a recognition operation.

FIG. 6 is a sequence diagram for explaining the recognition operation.

Arithmetic operation section 303 of power supply instruction section 300A calculates area requirement AR by using the system frequency detected by frequency meter 301 (step S601).

Subsequently, arithmetic operation section 303 collects the LFC adjustment capacity of thermal power generation equipment 4 from a thermal power generation equipment controller not illustrated (step S602).

Meanwhile, communicator 201 of storage battery SCADA 200 transmits the newest total adjustable capacity $P_{ES}$ among calculated total adjustable capacities $P_{ES}$ to power supply instruction section 300A (step S603).

Communicator 302 of power supply instruction section 300A receives the newest total adjustable capacity $P_{ES}$ transmitted from communicator 201 of storage battery SCADA 200, and outputs the newest total adjustable capacity $P_{ES}$ to arithmetic operation section 303.

When arithmetic operation section 303 accepts the newest total adjustable capacity $P_{ES}$, arithmetic operation section 303 derives an LFC capacity by using area requirement AR, the LFC adjustment capacity of thermal power generation equipment 4, and the newest total adjustable capacity $P_{ES}$ thereof. Subsequently, arithmetic operation section 303 assigns a capacity with an abrupt variation component excluded from the LFC capacity to thermal power generation equipment 4, and assigns the remaining LFC capacity $LFC_{ES}$ (note that $LFC_{ES} \leq P_{ES}$) to the storage battery group as LFC assignment capacity $LFC_{ES}$ (step S604).

In the present exemplary embodiment, arithmetic operation section 303 determines a ratio of assignment of the LFC capacity to thermal power generation equipment 4 and assignment of the LFC capacity to the storage battery group (LFC assignment capacity $LFC_{ES}$), with an eye to economy while considering assignment amounts of EDC (Economic power supply control) component.

Subsequently, arithmetic operation section 303 generates a charge and discharge gain line (see FIG. 4) showing LFC assignment capacity $LFC_{ES}$, and maximum value $\Delta f_{max}$ of the integral values of the frequency deviations set in advance (step S605).

The charge and discharge gain line shown in FIG. 4 shows the charge and discharge amount of the storage battery group with respect to integral value $\Delta f$ of the frequency deviation.

The charge and discharge gain line changes to be line 400A and line 400B in accordance with the value ($LFC_{ES}$ and $LFC_{ES}'$) of LFC assignment capacity $LFC_{ES}$ within the range of "LFC assignment capacity $LFC_{ES} \leq$ total adjustable capacity $P_{ES}$". Note that as the charge and discharge gain line, a charge and discharge gain line with use of a frequency deviation may be used, other than the charge and discharge gain line shown in FIG. 4. In this case, the operation becomes a governor free operation, rather than an LFC operation.

Subsequently, arithmetic operation section 303 transmits the charge and discharge gain line to storage battery SCADA 200 from communicator 302 (step S606).

Storage battery SCADA 200 and power supply instruction section 300A repeat the operation of steps S601 to S606, that is, the recognition operation at periods $T_m$ (for example, $T_m$=four minutes).

Note that recognition section 203 of storage battery SCADA 200 receives charge and discharge gain lines via communicator 201, and retains only the newest charge and discharge gain line among the charge and discharge gain lines.

Next, an operation of storage battery SCADA 200 generating allotment information and transmitting the allotment information to each of local charge and discharge devices 100, and each of local charge and discharge devices 100 that derive the local charge and discharge gain line for controlling charge and discharge of power storage device 3 based on the allotment information (hereinafter, called an "allotment operation") will be described.

Figure 7:
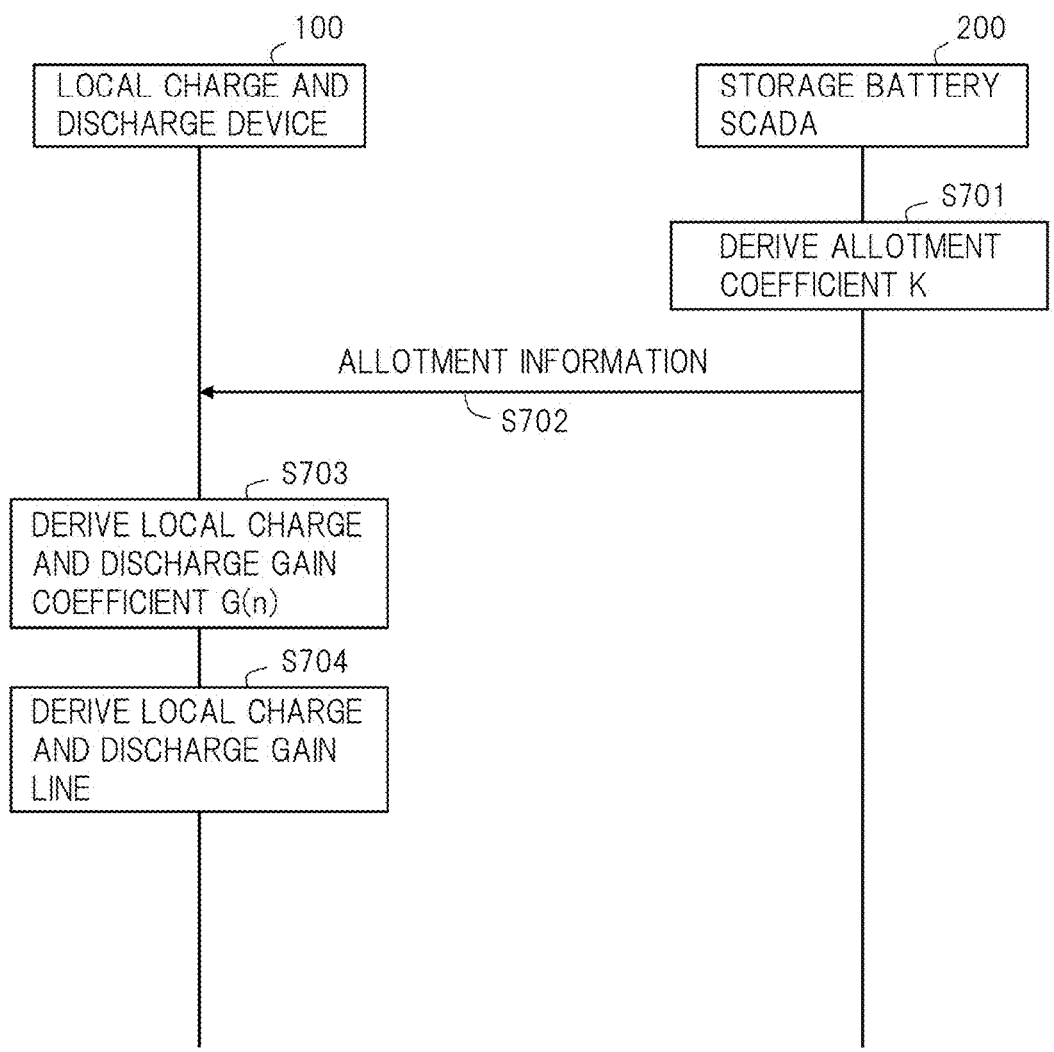
FIG. 7 is a sequence diagram for explaining an allotment operation.

FIG. 7 is a sequence diagram for describing the allotment operation. In FIG. 7, the number of local charge and discharge devices 100 is set at one in order to simplify explanation.

Arithmetic operation section 204 of storage battery SCADA derives allotment coefficient K by using LFC assignment capacity $LFC_{ES}$ shown in the newest charge and discharge gain line retained by recognition section 203, the newest total adjustable capacity $P_{ES}$ which recognition section 203 has, and mathematical expression shown in formula 3 (step S701).

$$K = \frac{LFC_{ES}}{P_{ES}} \qquad \text{[Formula 3]}$$

Subsequently, arithmetic operation section 204 transmits allotment information showing allotment coefficient K and maximum value $\Delta f_{max}$ of the integral values of the frequency deviations shown in the newest charge and discharge gain line to each of local charge and discharge devices 100 from communicator 201 (step S702). Note that formula 3 is used as allotment coefficient K in the present exemplary embodiment, but besides the above, a flexible operation can be performed such as an operation of instructing the individual storage batteries to forcibly issue outputs that is close to a limit as the value of allotment coefficient K or the like at the time of a desperate situation.

Note that in the present exemplary embodiment, the following processing is executed in step S702.

Arithmetic operation section 204 determines a smaller value out of the newest storage battery distribution factor $\alpha$ discharge (n) at the time of discharge and storage battery distribution factor $\alpha$ charge (n) at the time of charge that are derived by recognition section 203 as storage battery distribution factor $\alpha$ (n), for each of power storage devices 3.

Subsequently, arithmetic operation section 204 generates operation-related information showing storage battery distribution factor $\alpha(n)$ and rated output P(n) that is retained in database 202, for each of power storage devices 3.

Subsequently, arithmetic operation section 204 adds allotment information to each operation-related information, and transmits the allotment information to which the operation-related information is added from communicator 201 to local charge and discharge device 100 corresponding to power storage device 3 corresponding to the operation-related information.

In each of local charge and discharge devices 100, arithmetic operation section 104 receives the allotment information with the operation-related information via communicator 102.

Arithmetic operation section 104 derives local charge and discharge gain coefficient G(n) by using the allotment information with the operation-related information and the mathematical expression shown in formula 4 (step S703).

$$G(n) = \frac{K \cdot a(n) \cdot P(n)}{\Delta f_{max}} \qquad \text{[Formula 4]}$$

Note that the values in the mathematical expression of formula 4 are shown in the allotment information with the operation-related information.

Subsequently, arithmetic operation section 104 derives local charge and discharge gain line 800A shown in FIG. 8 by using local charge and discharge gain coefficient G(n), and maximum value $\Delta f_{max}$ of the integral values of the frequency deviations shown in the allotment information with the operation-related information (step S704).

Figure 8:
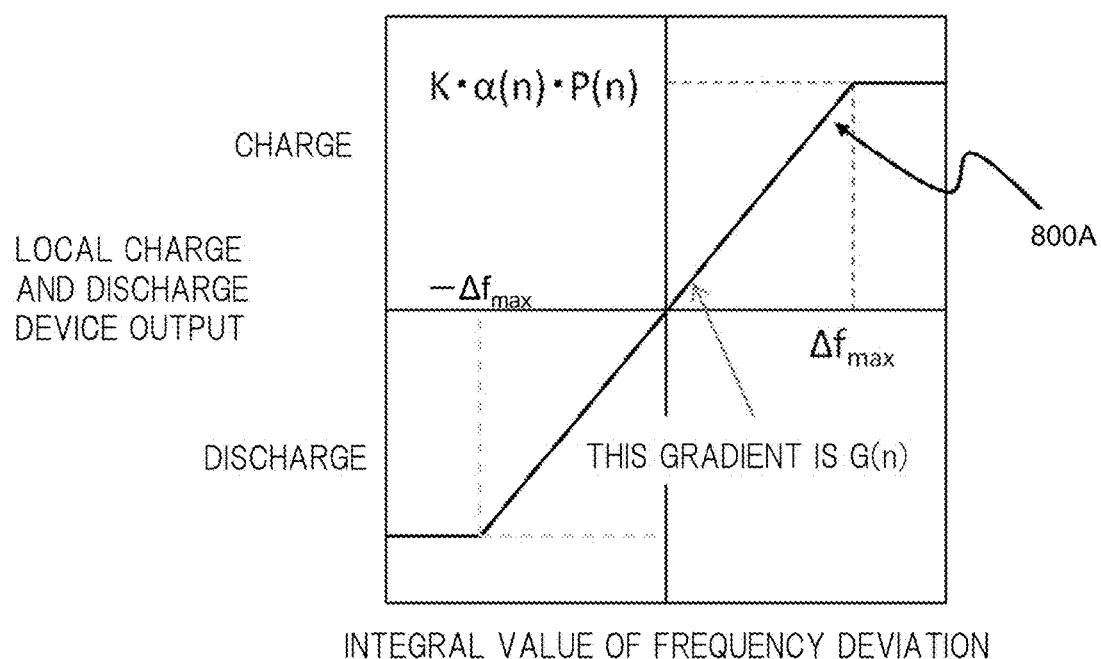
FIG. 8 is a diagram showing a local charge and discharge gain line.

Local charge and discharge gain line 800A shown in FIG. 8 becomes a straight line that passes through origin 0, and has a gradient that is local charge and discharge gain coefficient G(n) when integral value $\Delta f$ of the frequency deviation is in a range of $-\Delta f_{max} \leq \Delta f \leq \Delta f_{max}$, takes a constant value of "−K·α(n)·P(n)" (the minus sign represents discharge) when integral value Δf of the frequency deviation is in a range of Δf<−Δf$_{max}$, and takes a constant value of "K·α(n)·P(n)" when integral value Δf of the frequency deviation is in a range of Δf$_{max}$<Δf.

Storage battery SCADA 200 and each local charge and discharge device 100 repeat steps S701 to S704 at periods T (for example, T=one minute).

In each of local charge and discharge devices 100, arithmetic operation section 104 receives pieces of allotment information together with the operation-related information via communicator 102, and retains only the newest piece of allotment information with the operation-related information from among the pieces of allotment information together with the operation-related information.

Next, the operation of local charge and discharge device 100 controlling charge and discharge of power storage device 3 based on the allotment information with the operation-related information and the system frequency (hereinafter, called a "charge and discharge control operation") will be described.

Figure 9:
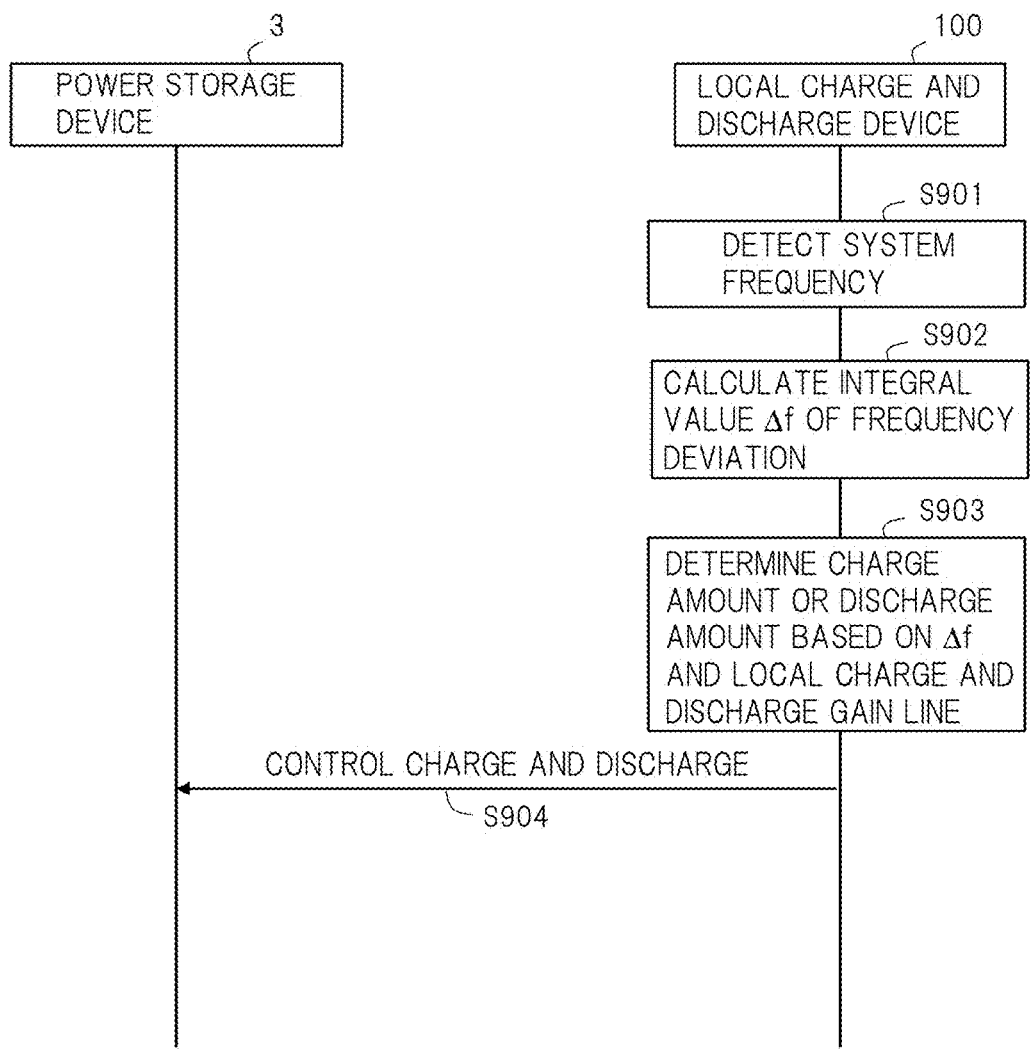
FIG. 9 is a sequence diagram for explaining a charge and discharge control operation.

FIG. 9 is a sequence diagram for describing the charge and discharge control operation.

In local charge and discharge device 100, arithmetic operation section 104 causes frequency meter 103 to detect a system frequency (step S901).

Subsequently, arithmetic operation section 104 calculates integral value Δf of the frequency deviation by subtracting the reference frequency of the system frequency from the detection result of frequency meter 103 and integrating the subtracted result (step S902). Note that arithmetic operation section 104 may use a system frequency of power system 1 that is received from outside, instead of the system frequency of power system 1 that is detected by frequency meter 103. In this case, arithmetic operation section 104 also functions as second detection means.

Subsequently, arithmetic operation section 104 calculates a charge amount or a discharge amount of power storage device 3 in accordance with integral value Δf of the frequency deviation and the local charge and discharge gain line (step S903).

In the present exemplary embodiment, when the absolute value of integral value Δf of the frequency deviation is maximum value Δf$_{max}$ of the integral values of the frequency deviations or smaller in step S903, arithmetic operation section 104 calculates the absolute value of a value (G(n)·Δf) that is obtained by multiplying local charge and discharge gain coefficient G(n) by integral value Δf of the frequency deviation. Meanwhile, when the absolute value of integral value Δf of the frequency deviation is larger than maximum value Δf$_{max}$ of the integral values of the frequency deviations, arithmetic operation section 104 calculates a value (K·α(n)·P(n)) obtained by multiplying allotment coefficient K, storage battery distribution factor α(n) and rated output P(n) by one another. In this example, the case where the gradients of G(n) are the same on the charge side and the discharge side, namely, symmetrical with respect to a point is shown in FIG. 8, but in reality, the case where the gradients are not symmetrical with respect to a point is assumed, and in that case, G(n) is determined in a similar way.

Subsequently, when integral value Δf of the frequency deviation is a positive value, arithmetic operation section 104 causes power storage device 3 to execute a charge operation by a power amount shown in the calculation result, and causes power storage device 3 to execute a discharge operation by a power amount shown in the calculation result, when integral value Δf of the frequency deviation is a negative value (step S904).

Each local charge and discharge device 100 repeats steps S901 to S904 at periods T$_1$ (for example, T$_1$=0.1 seconds). As a result, the value of the integral value of the frequency deviation changes at each time, and charge and discharge based on G(n)·Δf are performed at each time.

When N=1000 of power storage devices were controlled in power control system 1000 that is described above, communication problems occurred for 20 seconds between load dispatching instruction section 300A and storage battery SCADA halfway, but since the problem occurred during the interval of four minutes in which the charge and discharge gain line was transmitted, the control state did not change before and after the communication problem, and therefore, it was possible to stably control limiting system frequency variation.

Furthermore, from the viewpoint of total optimization of the thermal power generation equipment on the system side and the power storage devices, control allotment from the standpoint of the economical use and the response speed of the thermal power generation equipment is enabled to be given to the distributed storage battery group.

Next, the effect of the present exemplary embodiment will be described.

In the present exemplary embodiment, the time interval at which local charge and discharge device 100 acquires allotment information from storage battery SCADA 200 is longer than the operation interval at which local charge and discharge device 100 controls the operation of power storage device 3 by using the allotment information. Therefore, as compared with the case where the time interval, at which local charge and discharge device 100 acquires the allotment information, is the operation interval of power storage device 3 or shorter, the processing of acquiring the allotment information is less influenced by communication problems that are likely to occur between local charge and discharge device 100 and storage battery SCADA 200.

Note that the above-described effect is also brought about with local charge and discharge device 100 including detector 101, communicator 102 and arithmetic operation section 104. Furthermore, the above-described effect is also brought about with storage battery SCADA 200 including communicator 201, recognition section 203 and arithmetic operation section 204. Furthermore, the above-described effect is also brought about with the battery control system including local charge and discharge device 100 including detector 101, communicator 102 and arithmetic operation section 104, and storage battery SCADA 200 including communicator 201, recognition section 203 and arithmetic operation section 204.

Figure 10:
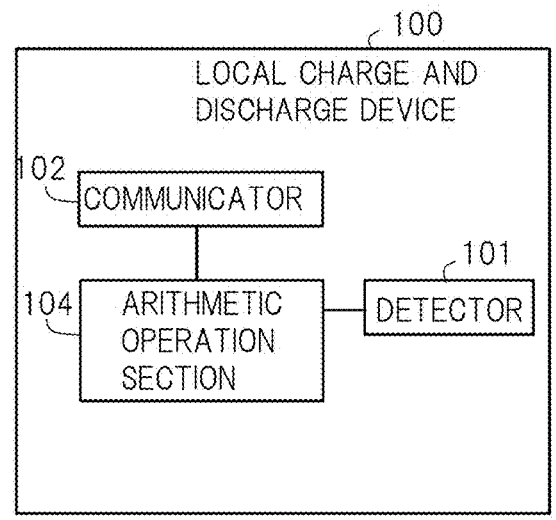
FIG. 10 is a diagram showing a local charge and discharge device including detector 101, communicator 102 and arithmetic operation section 104.

FIG. 10 is a diagram showing the local charge and discharge device including detector 101, communicator 102 and arithmetic operation section 104.

Figure 11:
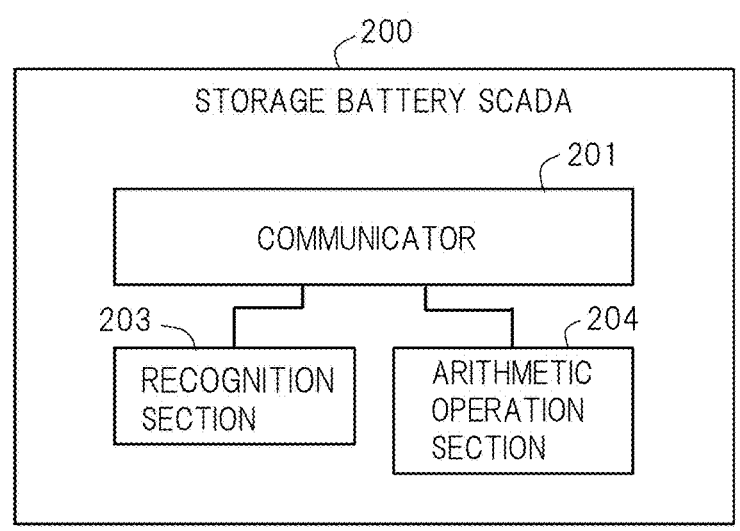
FIG. 11 is a diagram showing storage battery SCADA 200 including communicator 201, recognition section 203 and arithmetic operation section 204.

FIG. 11 is a diagram showing storage battery SCADA 200 including communicator 201, recognition section 203 and arithmetic operation section 204.

Furthermore, frequency meter 103 measures the system frequency at an interval shorter than the time interval at which frequency meter 103 acquires the allotment information. Arithmetic operation section 104 controls the operation of power storage device 3 based on the newest system frequency measured by frequency meter 103. Therefore, the operation of power storage device 3 can be adjusted in response to a change in the actual state of the power system, which is detected at a interval shorter than the time interval at which the allotment information is acquired.

Furthermore, communicator 102 executes the transmission and reception processing to transmit the detection result of detector 101 to storage battery SCADA 200 and to receive the allotment information from storage battery SCADA 200 at a predetermined time interval. Therefore, communicator 102 can receive the allotment information, as a response to transmission of the detection result of detector 101.

Furthermore, storage battery SCADA 200 accepts the charge and discharge gain line that is used to generate allotment information from power supply instruction section 300A that controls power system 1. Therefore, it is possible to acquire the charge and discharge gain line with consideration given to the operation of thermal power generation equipment 4 on the system side, for example. Therefore, power demand and supply balance control by the thermal power generation equipment 4 on the system side and power storage device 3 can be carried out with high precision.

Furthermore, storage battery SCADA 200 accepts the charge and discharge gain line in which total adjustable capacity $P_{ES}$ is reflected from power supply instruction section 300A. Therefore, the load of power storage device 3 can be adjusted in accordance with the total adjustable capacity of power storage device 3.

Furthermore, local charge and discharge device 100 controls the operation of power storage device 3 based on integral value Δf of the frequency deviation and the allotment information (the allotment coefficient K and maximum value $Δf_{max}$ of the integral values of the frequency deviations). Therefore, the operation of power storage device 3 can be adjusted in response to not only the allotment information but also the actual change of the system frequency.

Note that in the present exemplary embodiment, when control of effective power P and reactive power Q in power storage device 3 is considered, the maximum value of the output amount of power storage device 3 that is assigned to control of reactive power P (in short, when the output of Q is separately used in parallel, the effect of the output maximum value becomes lower than the rated output of the output amount by P is taken into consideration) may be used instead of rated output P(n).

Furthermore, in the above-described exemplary embodiment, storage battery SCADA 200, local control device 100 and the like properly collect and distribute time synchronization information in the process of information communication, and time synchronization is performed among the devices.

Furthermore, local charge and discharge device 100 may be realized by a computer. In this case, the computer reads and executes the program recorded in a recording medium such as computer-readable CD-ROM (Compact Disk Read Only Memory), and executes the respective functions that local charge and discharge device 100 has. The recording medium is not limited to a CD-ROM and other recording media can be used.

Furthermore, storage battery SCADA 200 may be realized by a computer. In this case, the computer reads and executes the program recorded in a computer-readable recording medium, and executes each of the functions that storage battery SCADA 200 has.

Furthermore, instead of power supply instruction section 300A, a small-scale EMS (Energy Management System) that is installed in the vicinity of a distribution substation may be used.

Second Exemplary Embodiment

Figure 12:
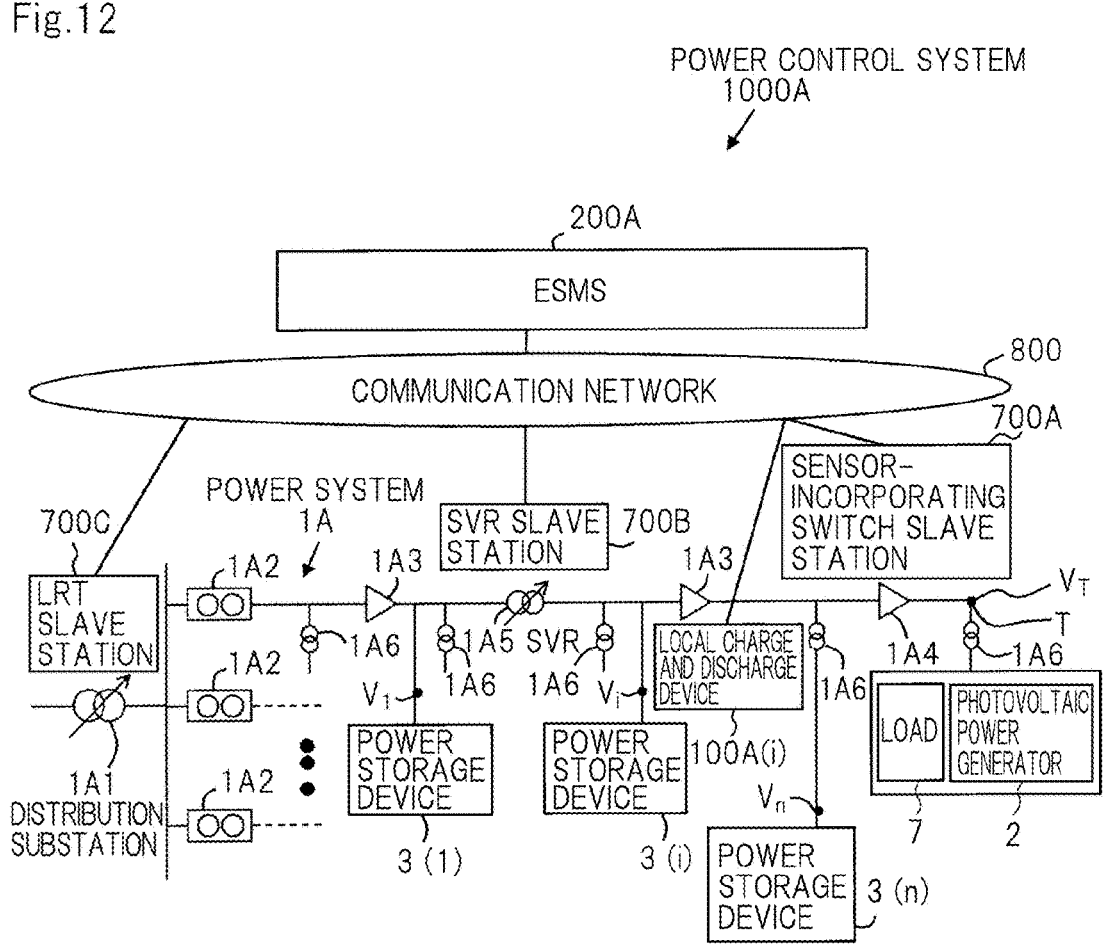
FIG. 12 is a diagram showing power control system 1000A that adopts a battery control system of a second exemplary embodiment of the present invention.

FIG. 12 is a diagram showing power control system 1000A that adopts a battery control system of a second exemplary embodiment of the present invention. In FIG. 12, the components that have the same configurations as shown in FIG. 1 or 2 are assigned the same reference signs.

In FIG. 12, power control system 1000A includes power system 1A, photovoltaic power generator (solar battery) 2, power storage devices (storage batteries) 3(1) to 3(n), load 7, local charge and discharge devices 100A(1) to 100A(n), ESMS (Energy Storage Management System) 200A, sensor-incorporating switch slave station 700A, SVR slave station 700B, and LRT (Load Ratio Transformer) slave station 700C.

Local charge and discharge devices 100A(1) to 100A(n) are in one-to-one correspondence with power storage devices (storage batteries) 3(1) to 3(n). Note that FIG. 12 shows local charge and discharge device 100A(i) from among local charge and discharge devices 100A(1) to 100A(n) in order to simplify the explanation.

Each of local charge and discharge devices 100A, ESMS 200A, sensor-incorporating switch slave station 700A, SVR slave station 700B and LRT slave station 700C are connected to communication network 800.

Power system 1A includes distribution substation LRT 1A1, breakers 1A2, switch 1A3, sensor-incorporating switch 1A4, SVR 1A5 and pole transformer 1A6.

Power control system 1000A limits variation in system frequency that result from changes in the amount of power generated by photovoltaic power generator 2, due to weather conditions, which is of concern to power system 1A, to which photovoltaic power generator 2 is interconnected, by a voltage adjusting operation of SVR 1A5 and charge and discharge operations of respective power storage devices 3.

Power system 1A is a system for supplying power to load 7 on the customer side. While power system 1A also includes other devices (for example, thermal power generation equipment), these devices are omitted to simplify the explanation.

LRT 1A1, SVR 1A5 and pole transformer 1A6 are voltage adjustors. Breaker 1A2, switch 1A3 and sensor-incorporating switch 1A4 are used to disconnect a specific part of power system 1A (for example, a part where a trouble occurs) from power system 1A.

Each local charge and discharge device 100A is an example of a first control device or a battery control device. Each local charge and discharge device 100A also bears the function of a slave station provided in corresponding power storage device 3. Note that the number of local charge and discharge devices 100A and the number of power storage devices 3 are each one or more.

Figure 13:
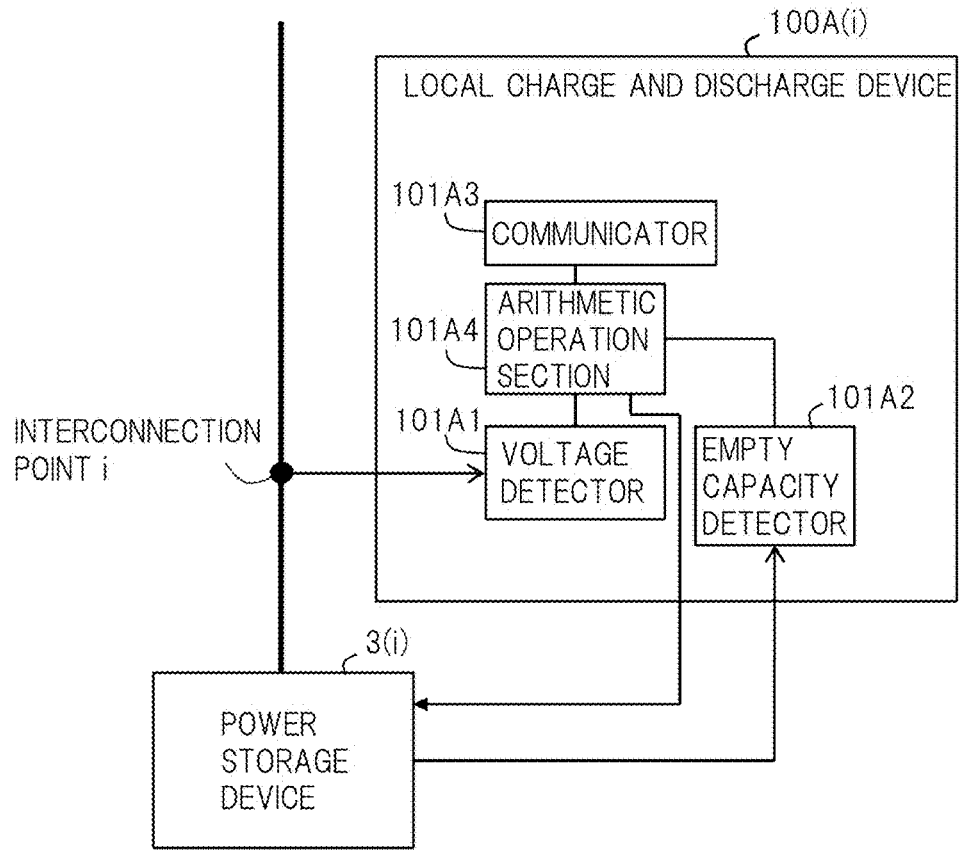
FIG. 13 is a diagram showing an example of local charge and discharge device 100A.

FIG. 13 is a diagram showing an example of local charge and discharge device 100A(i).

In FIG. 13, local charge and discharge device 100A(i) includes voltage detector 101A1, empty capacity detector 101A2, communicator 101A3, and arithmetic operation section 101A4.

Voltage detector 101A1 is an example of first detection means and second detection means. Voltage detector 101A1 detects voltage $V_i$ of interconnection point i of power system 1A and power storage device 3(i) at periods $T_g$ (for example, $T_g$=10 minutes). Furthermore, voltage detector 101A1 detects voltage $V_i$ of interconnection point i at periods $T_h$ (for example, $T_h$=0.1 seconds). Voltage $V_i$ of interconnection point i is an example of a state of interconnection point i, battery-related information and a state of power system 1A. Note that the state of the interconnection point is not limited to the voltage of the interconnection point and that other values may be used.

Empty capacity detector 101A2 detects empty capacity $Q_i$ of power storage device 3(*i*) at periods $T_g$. Note that empty capacity $Q_i$ of power storage device 3(*i*) refers to capacity that can be used by power storage device 3(*i*) to adjust the voltage of power system 1A at the point of time, is calculated based on SOC, for example, and is ensured for the time period $T_g$.

Communicator 101A3 is an example of first communication means. Communicator 101A3 communicates with ESMS 200A.

Arithmetic operation section 101 A4 executes a control information acquiring operation of obtaining operation control information to control the operation of power storage device 3(*i*) from ESMS 200A (transmission and reception processing), and a charge and discharge control operation to control a charge and discharge operation of power storage device 3(*i*) based on the operation control information and voltage $V_i$ at interconnection point i (battery operation control processing).

Arithmetic operation section 101A4 intermittently executes the control information acquiring operation, and executes the charge and discharge control operation at time intervals shorter than the time intervals of the control information acquiring operation.

Arithmetic operation section 101A4 repeatedly executes the control information acquiring operation at periods $T_g$, and repeatedly executes the charge and discharge control operation at periods $T_h$ (for example, $T_h$=0.1 seconds).

Note that period $T_g$ and Period $T_h$ are not limited to 10 minutes and 0.1 seconds, and period $T_g$ can be longer than period $T_h$.

Furthermore, both or any one of the operation time intervals of the control information acquiring operation and the operation time interval of the charge and discharge control operation do not or does not have to be constant, and the shortest time interval from among the respective operation time intervals of the control information acquiring operation can be longer than the longest time from among the respective operation time intervals of the charge and discharge control operation.

Furthermore, arithmetic operation section 101A4 may execute the control information acquiring operation in response to the voltage request that requests voltage $V_i$ of interconnection point i sent from ESMS 200A, or may execute the control information acquiring operation autonomously.

Here, the control information acquiring operation of arithmetic operation section 101 A4 will be described.

Arithmetic operation section 101A4 transmits voltage $V_i$ of interconnection point i detected by voltage detector 101A1, and empty capacity $Q_i$ of power storage device 3(*i*) detected by empty capacity detector 101A2 to ESMS 200A from communicator 101A3.

Communicator 101A3 transmits voltage $V_i$ of interconnection point i and empty capacity $Q_i$ of power storage device 3(*i*) to ESMS 200A, and thereafter, receives operation control information from ESMS 200A.

Subsequently, the charge and discharge control operation of arithmetic operation section 101A4 will be described. Arithmetic operation section 101A4 controls the charge and discharge operation of power storage device 3(*i*) based on the operation control information received by communicator 101A3, and voltage $V_i$ of interconnection point i detected by voltage detector 101A1.

Next, sensor-incorporating switch slave station 700A will be described.

Figure 14:
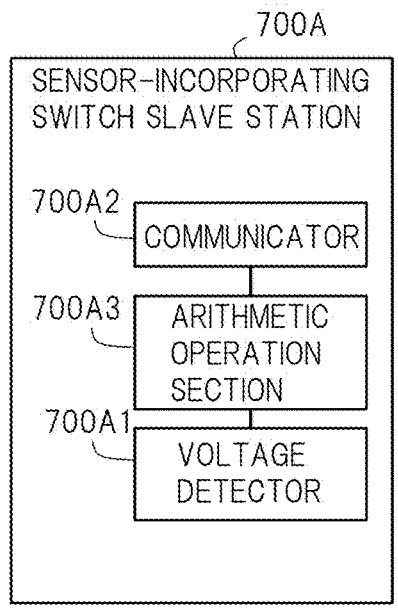
FIG. 14 is a diagram showing an example of sensor-incorporating switch slave station 700A.

FIG. 14 is a diagram showing an example of sensor-incorporating switch slave station 700A.

Sensor-incorporating switch slave station 700A is an example of an external control device. Sensor-incorporating switch slave station 700A includes voltage detector 700A1, communicator 700A2 and arithmetic operation section 700A3.

Voltage detector 700A1 detects adjustment target voltage $V_T$ that is a voltage of voltage adjustment target spot T (see FIG. 17) in power system 1A.

Communicator 700A2 communicates with ESMS 200A.

Arithmetic operation section 700A3 transmits adjustment target voltage $V_T$ detected by voltage detector 700A1 to ESMS 200A from communicator 700A2 at periods $T_g$.

Next, SVR slave station 700B will be described.

SVR slave station 700B communicates with ESMS 200A. For example, SVR slave station 700B notifies ESMS 200A of an output voltage of SVR 1A5 at periods $T_g$, and further, receives an SVR settling constant from ESMS 200A at periods $T_g$.

The SVR settling constant is information for determining the output range of the output voltage of SVR 1A5 (hereinafter, called the "conversion output range") at the time of adjustment-target voltage $V_T$ falling within a proper voltage range. In the present exemplary embodiment, as the SVR settling constant, center value Vref(t) of the conversion output range, upper limit value Vref_high(t) of the conversion output range, and lower limit value Vref_low(t) of the conversion output range are used. Note that Vref(t) that expresses the center value of the conversion output range may be omitted.

SVR slave station 700B sets the newest SVR settling constant to SVR 1A5. Note that SVR 1A5 is an example of the voltage adjustment device. SVR 1A5 switches a tap (not illustrated) of SVR 1A5 and changes adjustment target voltage $V_T$ to be within a proper voltage range, when adjustment target voltage $V_T$ is continuously outside the proper voltage range for settling time period Ts, namely, when the output voltage of SVR 1A5 is continuously outside the conversion output range for the settling time period Ts. Note that the control method of SVR 1A5 described above is a known technique. Furthermore, settling time period Ts is an example of a specific time period.

Next, ESMS 200A will be described.

Figure 15:
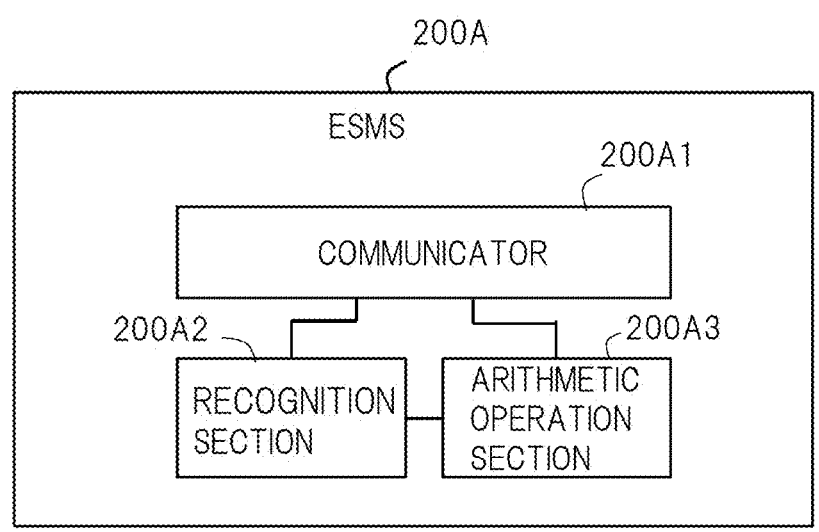
FIG. 15 is a diagram showing an example of ESMS 200A.

FIG. 15 is a diagram showing an example of ESMS 200A.

ESMS 200A is an example of a second control device or a battery control support device. ESMS 200A includes communicator 200A1, recognition section 200A2 and arithmetic operation section 200A3.

Communicator 200A1 is an example of second communication means. Communicator 200A1 communicates with respective local charge and discharge devices 100A and sensor-incorporating switch slave station 700A. For example, communicator 200A1 receives voltages V of respective interconnection points and empty capacities Q of corresponding power storage devices 3 from respective local charge and discharge devices 100A. Furthermore, communicator 200A1 receives adjustment target voltage $V_T$ from sensor-incorporating switch slave station 700A.

Recognition section 200A2 is an example of recognition means. Recognition section 200A2 recognizes (stores) the information (voltages V of the respective interconnection points, empty capacities Q of respective power storage devices 3 and adjustment target voltage $V_T$) received by communicator 200A1 by associating the information with reception time points. Note that adjustment target voltage $V_T$ is an example of the situation of power system 1A.

Arithmetic operation section 200A3 is an example of processing means. Arithmetic operation section 200A3 generates correlation information showing the correlation of voltage V of the interconnection point and adjustment target voltage $V_T$ for each of the interconnection points based on voltage V of each of the interconnection points received by communicator 200A1, and adjustment target voltage $V_T$ recognized by recognition section 200A2.

Furthermore, arithmetic operation section 200A3 derives voltage adjustment allotment information α based on the newest empty capacity Q of each of power storage devices 3. For example, when arithmetic operation section 200A3 is notified of respective empty capacities Q of a plurality of power storage devices 3, arithmetic operation section 200A3 derives voltage adjustment allotment information α that makes the ratio of allotments higher for larger empty capacities Q among the empty capacities Q whose arithmetic operation section 200A3 is notified, for each of power storage devices 3.

Arithmetic operation section 200A3 generates the operation control information including the correlation information and voltage adjustment allotment information α, for each of power storage devices 3, and transmits each piece of the operation control information to local charge and discharge device 100A corresponding to power storage device 3 that corresponds to the operation control information, from communicator 200A1.

Furthermore, arithmetic operation section 200A3 generates SVR settling constants (Vref(t), Vref_high(t) and Vref_low(t)) based on adjustment target voltage $V_T$, and the output voltage of SVR 1A5 whose arithmetic operation section 200A3 is notified from SVR slave station 700B. Note that a method for generating the SVR settling constants is a known technique, and therefore, a detailed explanation will be dropped. Arithmetic operation section 200A3 transmits the SVR settling constants (Vref(t), Vref_high(t) and Vref_low(t)) to SVR slave station 700B from communicator 200A1.

Next, operations will be described.

First, an operation of generating the SVR settling constants and setting the SVR settling constants to SVR 1A5 (hereinafter, called a "setting operation") will be described.

FIG. 16 is a sequence diagram for describing the setting operation.

In sensor-incorporating switch slave station 700A, arithmetic operation section 700A3 causes voltage detector 700A1 to detect adjustment target voltage $V_T$ (step S1601), and transmits adjustment target voltage $V_T$ detected by voltage detector 700A1 to ESMS 200A from communicator 700A2 (step S1602).

Furthermore, SVR slave station 700B detects the output voltage of SVR 1A5, and transmits the output voltage of SVR 1A5 to ESMS 200A (step S1603).

In ESMS 200A, when communicator 200A1 receives adjustment target voltage $V_T$ from sensor-incorporating switch slave station 700A and the output voltage of SVR 1A5 from SVR slave station 700B, recognition section 200A2 stores adjustment target voltage $V_T$ received by communicator 200A1 and the output voltage of SVR 1A5 by associating adjustment target voltage $V_T$ and the output voltage with each other.

Subsequently, arithmetic operation section 200A3 derives the SVR settling constants (Vref(t), Vref_high(t) and Vref_low(t)) based on adjustment target voltage $V_T$ and the output voltage of SVR 1A5 in recognition section 200A2 (step S1604).

Subsequently, arithmetic operation section 200A3 transmits the SVR settling constants to SVR slave station 700B from communicator 200A1 (step S1605).

When SVR slave station 700B receives SVR settling constants, SVR slave station 700B sets the SVR settling constants to SVR 1A5 (step S1606). Note that when SVR settling constants are already set to SVR 1A5, SVR slave station 700B updates the SVR settling constants set to SVR 1A5 to the newest SVR settling constants.

Sensor-incorporating switch slave station 700A, SVR slave station 700B and ESMS 200A repeat steps S1601 to S1606 at periods $T_g$.

Next, the operation of SVR 1A5 will be described.

When the output voltage of SVR 1A5 is outside upper limit value Vref_high(t) of the conversion output range specified by the SVR settling constants continuously for settling time period Ts, SVR 1A5 switches the tap of SVR 1A5 to lower the output voltage of SVR 1A5, and changes the output voltage of SVR 1A5 to a voltage within the conversion output range.

Furthermore, when the output voltage of SVR 1A5 is continuously outside lower limit value Vref_low(t) of the conversion output range specified by the SVR settling constants for the settling time period Ts, SVR 1A5 switches the tap of SVR 1A5 to raise the output voltage of SVR 1A5, and changes the output voltage of SVR 1A5 to a voltage within the conversion output range.

Note that settling time period Ts may be the value set in advance or may be changed with the lapse of time with consideration given to extending the life of SVR 1A5 and a secular change of SVR 1A5.

Though the voltage of power system 1A is adjusted by the operation of SVR 1A5, high-speed variation components from among the variation components of the system voltage, for example, the components that result from output of a renewable power supply the power generation amount of which changes irregularly in accordance with the weather, cannot be handled with only the voltage adjustment by SVR 1A5.

Therefore, in the present exemplary embodiment, the voltage variation components that cannot be handled with the voltage adjustment by SVR 1A5 are reduced by the charge and discharge operations of respective power storage devices 3.

Next, an operation of ESMS 200A that generates operation control information that is required to perform the charge and discharge operations of power storage devices 3, and that transmits the operation control information to respective local charge and discharge devices 100A (hereinafter, called a "generation operation") will be described.

FIG. 17 is a sequence diagram for describing the generation operation.

In sensor-incorporating switch slave station 700A, arithmetic operation section 700A3 causes voltage detector 700A1 to detect adjustment target voltage $V_T$ (step S1701), and transmits adjustment target voltage $V_T$ detected by voltage detector 700A1 to ESMS 200A from communicator 700A2 (step S1702).

In ESMS 200A, each time communicator 200A1 receives adjustment target voltage $V_T$ from sensor-incorporating switch slave station 700A, recognition section 200A2 stores adjustment target voltage $V_T$ received by communicator 200A1.

Subsequently, arithmetic operation section 200A3 of ESMS 200A calculates average value $V_{T,AVE}$ of adjustment target voltage $V_T$ in recognition section 200A2 (step S1703). Recognition section 200A2 retains average value $V_{T,AVE}$ that is the calculation result.

Meanwhile, in each of local charge and discharge devices 100A, arithmetic operation section 101A4 causes voltage detector 101A1 to detect voltage V of the interconnection point, and retains voltage V (step S1704). Hereinafter, voltage $V_i$ of interconnection point i will be cited as an example and described in order to simplify the explanation.

Subsequently, arithmetic operation section 101A4 calculates average value $V_{i,AVE}$ of retained voltages $V_i$(step S1705).

Subsequently, arithmetic operation section 101A4 transmits average value $V_{i,AVE}$ to ESMS 200A from communicator 101A3 (step S1706).

In ESMS 200A, each time communicator 200A1 receives an average value (hereinafter, "average value $V_{i,AVE}$" will be described) from each of local charge and discharge devices 100A, recognition section 200A2 stores average value $V_{i,AVE}$ received by communicator 200A1.

Subsequently, arithmetic operation section 200A3 of ESMS 200A derives a correlation function at a time point t of average value $V_{i,AVE}$ and average value $V_{T,AVE}$ in recognition section 200A2 as follows by using a mechanical learning method or the like, for example, for each interconnection point (step S1707).

Correlation function: $V_{T,AVE}(t)=a_i(t) \cdot V_{i,AVE}(t)+b_i(t)$

In the present exemplary embodiment, arithmetic operation section 200A3 derives a correlation function by using a plurality of average values $V_{i,AVE}$ (10 average values $V_{i,AVE}$ in sequence from the newest one, for example) in the interconnection point, and a plurality of average value $V_{T,AVE}$ (10 average values $V_{T,AVE}$ in sequence from the newest one, for example), for each of the interconnection points.

Furthermore, in each of local charge and discharge devices 100A, arithmetic operation section 101A4 causes empty capacity detector 101A2 to detect empty capacity Q(t) of power storage device 3 (step S1708), and transmits empty capacity Q(t) of power storage device 3, which is detected by empty capacity detector 101A2 (for example, empty capacity $Q_i(t)$ of power storage device 3(i)) to ESMS 200A from communicator 101A3 (step S1709).

Subsequently, arithmetic operation section 200A3 of ESMS 200A derives voltage adjustment allotment information α(t) of each of power storage devices 3 (for example, voltage adjustment allotment information $α_i(t)$ of power storage device 3(i)) based on the latest empty capacity Q(t) of each of power storage devices 3 (step S1710).

Subsequently, arithmetic operation section 200A3 generates operation control information including coefficients $a_i(t)$ and $b_i(t)$ of the correlation function and voltage adjustment allotment $α_i(t)$ for each of power storage devices 3, and transmits the operation control information to local charge and discharge device 100A corresponding to power storage device 3 that corresponds to the operation control information, from communicator 200A1 (step S1511). Note that coefficients $a_i(t)$ and $b_i(t)$ of the correlation function are examples of correlation information.

In local charge and discharge device 100A, when arithmetic operation section 101A4 receives the operation control information (coefficients $a_i(t)$ and $b_i(t)$ of the correlation function and voltage adjustment allotment αi(t)) via communicator 101A3, arithmetic operation section 101A4 retains the operation control information. Note that when arithmetic operation section 101A4 already retains the operation control information, arithmetic operation section 101A4 updates the operation control information already retained to the latest operation control information.

Sensor-incorporating switch slave station 700A, local charge and discharge device 100A and ESMS 200A repeat steps S1501 to S1511 at periods $T_g$.

Note that as adjustment target voltage $V_T$ that is used in calculation of the average values in step S1703, adjustment target voltage $V_T$ provided in step S1602 of FIG. 16 may be used. In this case, steps S1701 and S1702 can be omitted.

Next, the operation of each of local charge and discharge devices 100A that control reactive power output Q of power storage device 3 based on the operation control information and the voltage of the interconnection point (hereinafter, called a "power control operation") will be described. The power control operations in respective local charge and discharge devices 100A are common, and therefore, for simplification of explanation, the power control operation in local charge and discharge device 100A(i) will be described hereinafter.

FIG. 18 is a sequence diagram for describing the power control operation.

Arithmetic operation section 101A4 causes voltage detector 101A1 to detect voltage $V_i$ of interconnection point i (step S1801).

Subsequently, arithmetic operation section 101A4 calculates adjustment target voltage $V_T$ from voltage $V_i$ of interconnection point i, by performing the following calculation and using coefficients $a_i(t)$ and $b_i(t)$ of the correlation function included in the operation control information (step S1802).

Adjustment target voltage $V_T(t)=a_i(t) \cdot V_i(t)+b_i(t)$

Subsequently, arithmetic operation section 101A4 determines the magnitude relation of the calculated adjustment target voltage $V_T$, and upper limit threshold value $V_{mu}$ and lower limit threshold $V_{ml}$ that are set in arithmetic operation section 101A4 in advance. Note that upper limit threshold value $V_{mu}$ is a value larger than the upper limit value of the voltage range without requiring switching with respect to adjustment target voltage $V_T$, and lower limit threshold value $V_{ml}$ is a value smaller than the lower limit value of the voltage range without requiring switching with respect to adjustment target voltage $V_T$.

When calculated adjustment target voltage $V_T$ is larger than upper limit threshold value $V_{mu}$, arithmetic operation section 101 A4 calculates reactive power amount $Q_i(t)$ in accordance with mathematical expression of $Q_i(t)=[V_T(t)-V_{mu}] \times α_i(t)/(dV_i(t)/dQ_i(t))$. Subsequently, arithmetic operation section 101A4 causes power storage device 3(i) to output calculated reactive power amount Qi(t) (step S1804).

Furthermore, when calculated adjustment target voltage $V_T$ is smaller than lower limit threshold value $V_{ml}$ arithmetic operation section 101A4 calculates reactive power amount $Q_i(t)$ in accordance with mathematical expression of $Q_i(t)=[V_T(t)-Vml] \times α_i(t)/(dV_i(t)/dQ_i(t))$. Subsequently, arithmetic operation section 101A4 causes power storage device 3(i) to output calculated reactive power amount $Q_i(t)$ (step S1804).

Note that when calculated adjustment target voltage $V_T$ is from a lower limit threshold value $V_{ml}$ to upper limit threshold value $V_{mu}$ inclusive, arithmetic operation section 101A4 determines that adjustment is not necessary, and does not control charge and discharge of power storage device 3(i).

Local charge and discharge device 100 repeats steps S1801 to S1803 at periods $T_l$.

Next, the effect of the present exemplary embodiment will be described.

According to the present exemplary embodiment, in local charge and discharge device 100A, arithmetic operation section 101A4 controls the operation of power storage device 3 based on operation control information provided from ESMS 200A, and the voltage of the interconnection point measured by voltage detector 101A1. Therefore, it becomes possible to adjust the operation of power storage device 3 in response to an actual change in the state of the power system while following the operation control information.

Furthermore, ESMS 200A generates the correlation information showing the correlation of the voltage of the interconnection point detected by local charge and discharge device 100A and the adjustment target voltage. Local charge and discharge device 100A calculates the adjustment target voltage from the voltage of the interconnection point detected by local charge and discharge device 100A by using the correlation information, and when the calculated result is outside the voltage range (the predetermined voltage range) defined by upper limit threshold value $V_{mu}$ and lower limit threshold value $V_{ml}$, local charge and discharge device 100A controls the operation of power storage device 3 by using the correlation information so that the adjustment target voltage is within the voltage range.

Therefore, the adjustment target voltage that is outside the voltage range defined by upper limit threshold value $V_{mu}$ and lower limit threshold value $V_{ml}$ can be restored to the voltage range by controlling the charge and discharge of power storage device 3.

Furthermore, when the calculated result of the adjustment target voltage is larger than upper limit threshold value $V_{mu}$, local charge and discharge device 100A controls the operation of power storage device 3 by using the correlation information so that the adjustment target voltage is included in the range between upper limit threshold value $V_{mu}$ and the upper limit value of the proper voltage range of adjustment target voltage $V_T$. Furthermore, when the calculated result of the adjustment target voltage is smaller than lower limit threshold value $V_{ml}$, local charge and discharge device 100A controls the operation of power storage device 3 by using the correlation information so that the adjustment target voltage is included in the range between lower limit threshold value $V_{ml}$ and the lower limit value of the proper voltage range of adjustment target voltage $V_T$.

Therefore, a deviation from the proper voltage range of the voltage of the voltage adjustment target spot, namely, the adjustment target voltage can be reduced regardless of whether it is a low-speed component or a high-speed component, by using SVR 1A5 and power storage device 3. Furthermore, voltage adjustment using power storage device 3 does not hinder the operation of SVR 1A5, and therefore, switching the tap of SVR 1A5 can be effectively executed. Therefore, voltage adjustment that can be realized by switching the tap of SVR 1A5 does not have to be realized by charge and discharge of power storage device 3, and the reactive power output of power storage device 3 can also be reduced.

Furthermore, in the present exemplary embodiment, period $T_g$ of communication between local charge and discharge device 100A and ESMS 200A is longer than execution period $T_l$ of charge and discharge control of power storage device 3 that is executed by local charge and discharge device 100A, and therefore, resistance to interruption and problems in communication between local charge and discharge device 100A and ESMS 200A can be increased.

Note that while in the present exemplary embodiment, reactive power Q of power storage device 3 is controlled for the purpose of voltage adjustment, effective power P may be controlled instead of reactive power Q, or reactive power Q and effective power P may be controlled.

Furthermore, power storage device 3 may be interconnected under the pole transformer, or may be directly interconnected to the distribution line (however, in the case of power storage device 3 owned by a customer, reactive power output having a power factor of 0.85 or more acts as a constraint). Note that in the case of system power storage device 3, as for the interconnection point, interconnection is desirably made at a point at which coefficient $dV_T/dQ$ becomes large, between voltage $V_T$ of the power adjustment target spot and reactive power output Q of power storage device 3. Furthermore, in the case of using voltage control that uses effective power P, interconnection is desirably made at a point where $dV_T/dP$ becomes large.

Furthermore, the method that is used to derive the correction is not limited to the mechanical learning method and other methods can be used.

Moreover, while the average values are used to derive the correlation function, the average values do not have to be always used.

Further, local charge and discharge device 100A may be realized by a computer. In this case, the computer executes each of the functions of local charge and discharge device 100A by reading and executing a program recorded in a computer-readable recording medium.

As well, ESMS 200A may be realized by a computer. In this case, the computer executes each of the functions of ESMS 200A has by reading and executing a program recorded in a computer-readable recording medium.

In the respective exemplary embodiments described above, the illustrated configurations are only examples, and the present invention is not limited to the configurations.

While the invention of the present application is described with reference to the exemplary embodiments, the invention of the present application is not limited to the above-described exemplary embodiments. The configuration and the details of the invention of the present application can be variously changed in such a manner that a person skilled in the art can understand within the scope of the invention of the present application. This application claims the benefit of Japanese Patent Application No. 2013-23211, filed in Japan on Feb. 8, 2013, the entire contents of which are incorporated herein by reference.

REFERENCE SIGNS LIST 1000, 1000A POWER CONTROL SYSTEM
1 POWER SYSTEM
2 PHOTOVOLTAIC POWER GENERATOR
3 POWER STORAGE DEVICE
4 THERMAL POWER GENERATION EQUIPMENT
5 DISTRIBUTION TRANSFORMER
6 DISTRIBUTION LINE
7 LOAD
100 LOCAL CHARGE AND DISCHARGE DEVICE
101 DETECTOR
102 COMMUNICATOR
103 FREQUENCY METER
104 ARITHMETIC OPERATION SECTION
200 STORAGE BATTERY SCADA

201 COMMUNICATOR
202 DATABASE
203 RECOGNITION SECTION
204 ARITHMETIC OPERATION SECTION
300 CENTRAL POWER SUPPLY INSTRUCTION OFFICE
300A POWER SUPPLY INSTRUCTION SECTION
301 FREQUENCY METER
302 COMMUNICATOR
303 ARITHMETIC OPERATION SECTION
1A POWER SYSTEM
1A1 LRT
1A2 BREAKER
1A3 SWITCH
1A4 SENSOR-INCORPORATING SWITCH
1A5 SVR
1A6 POLE TRANSFORMER
100A LOCAL CHARGE AND DISCHARGE DEVICE
101A1 VOLTAGE DETECTOR
101A2 EMPTY CAPACITY DETECTOR
101A3 COMMUNICATOR
101A4 ARITHMETIC OPERATION SECTION
200A ESMS
200A1 COMMUNICATOR
200A2 RECOGNITION SECTION
200A3 ARITHMETIC OPERATION SECTION
700A SENSOR-INCORPORATING SWITCH SLAVE STATION
700A1 VOLTAGE DETECTOR
700A2 COMMUNICATOR
700A3 ARITHMETIC OPERATION SECTION
700B SVR SLAVE STATION
700C SENSOR-INCORPORATING SWITCH SLAVE STATION
800 COMMUNICATION NETWORK

What is claimed is:

1. A battery control device controlling an operation of a battery that is connected to a power system, the device comprising:
 a memory storing instructions; and
 one or more processors configured to execute the instructions to:
 detect state information that shows a state of the battery or a state of an interconnection point of the power system and battery;
 transmit the state information to an external device;
 receive, at a predetermined time interval, operation control information to control the operation of the battery from the external device;
 collect information of the state of the power system from the external device at a time interval shorter than the predetermined time interval; and
 control, at a time interval shorter than the predetermined time interval, the operation of the battery, wherein the control is based on the state of the power system and on the received operation control information.

2. The battery control device according to claim 1, wherein the one or more processors are further configured to:
 accept the state of the power system at a time interval shorter than the predetermined time interval; and
 control the battery operation based on a latest state of the power system.

3. The battery control device according to claim 1, wherein the one or more processors are further configured to:
 detect battery information for determining a chargeable and dischargeable capacity of the battery as the state information.

4. The battery control device according to claim 1, wherein the one or more processors are further configured to:
 control the operation of the battery based on the state of the power system being different from a reference state of the power system and based on the operation control information.

5. The battery control device according to claim 1, wherein the one or more processors are further configured to:
 receive the operation control information, wherein the operation control information shows correlation between the state of the interconnection point and an adjustment target voltage of the power system;
 calculate the adjustment target voltage from the state of the interconnection point by using the correlation information; and
 when a result of the calculation is outside a predetermined voltage range, control the operation of said battery by using the correlation information so that the adjustment target voltage is within the predetermined voltage range.

6. The battery control device according to claim 5, wherein the power system has a voltage adjustment device that changes the adjustment target voltage to be within a specific voltage range in the predetermined voltage range, when the adjustment target voltage is outside the specific voltage range for a specific time period; and
 the one or more processors are further configured to:
 when the result of the calculation is larger than an upper limit value of the predetermined voltage range, control the operation of the battery by using the correlation information so that the adjustment target voltage is in a range between the upper limit value and an upper limit value of the specific voltage range; and
 when the result of the calculation is smaller than a lower limit value of the predetermined voltage range, control the operation of the battery by using the correlation information so that the adjustment target voltage is in a range between the lower limit value and a lower limit value of the specific voltage range.

7. A battery control system comprising a first control device that controls an operation of a battery connected to a power system, and a second control device that communicates with said first control device,
 wherein the first control device comprises a memory storing first instructions; and one or more first processors configured to execute the first instructions to:
 detect state information that shows a state of the battery or a state of an interconnection point of the power system and battery;
 transmit the state information to the second control device;
 collect information of the state of the power system from the second control device at a time interval shorter than a predetermined time interval; and
 control, at a time interval shorter than the predetermined time interval, the operation of the battery from the second control device, wherein the control is based on a state of the power system and on the received operation control information, and the second control device comprises memory storing second instructions; and one or more second processors configured to execute the second instructions to:
communicate with the first device;
receive the state information;
recognize a state of the power system based on the state information; and
generate the operation control information based on the received state information and on a state of the recognized power system; and
transmit the operation control information from the second control device to the first control device.

8. A battery control method that is performed by a battery control device that controls an operation of a battery connected to a power system, the method comprising:
detecting state information that shows a state of the battery or a state of an interconnection point of the power system and battery;
transmitting the state information to an external device;
receiving, at a predetermined time interval, operation control information to control the operation of the battery from the external device;
collecting information of the state of the power system from the external device at a time interval shorter than the predetermined time interval; and
controlling, at a time interval shorter than the predetermined time interval, the operation of the battery, wherein the control is based on a state of the power system and on the received operation control information.

9. A battery control method that is performed by a battery control system including a first control device that controls an operation of a battery connected to a power system, and a second control device that communicates with the first control device, the method comprising:
detecting state information that shows a state of the battery or a state of an interconnection point of the power system and battery;
transmitting the state information to the second control device;
receiving, at a predetermined time interval, operation control information to control the operation of the battery from the second control device;
collecting information of the state of the power system from the second control device at a time interval shorter than the predetermined time interval;
controlling, at a time interval shorter than the predetermined time interval, the operation of the battery based on a state of the power system and based on the received operation control information;
receiving the state information from the first control device;
recognizing a state of the power system based on the state information;
generating the operation control information based on the state information and on the state of the recognized power system; and
transmitting the operation control information from the second control device to the first control device.

10. A non-transitory computer-readable recording medium recording a program for causing a computer to execute:
detecting state information that shows a state of a battery connected to a power system or a state of an interconnection point of the power system and battery;
transmitting the state information to an external device;
receiving, at a predetermined time interval, operation control information to control an operation of the battery from the external device;
collecting information of the state of the power system from the external device at a time interval shorter than the predetermined time interval; and
controlling, at a time interval shorter than the predetermined time interval, the operation of the battery, wherein the control is based on a state of the power system and on the received operation control information.

11. A battery control support device communicating to a battery control device that controls operation of a battery connected to a power system, the battery control support device comprising:
a memory storing instructions; and
one or more processors configured to execute the instructions to:
receive state information for the battery;
generate operation control information based on the received state information for the battery;
transmit the information of the state of the power system to the battery control device at a time interval shorter than a predetermined time interval; and
transmit, at the predetermined time interval, the operation control information to the battery control device in order to control the operation of the battery at a time interval shorter than the predetermined time interval, wherein the control is based on a state of the power system and on the operation control information.

12. The battery control support device according to claim 11,
wherein the one or more processors are further configured to:
receive battery information for determining a chargeable and dischargeable capacity of the battery as the state information.

13. The battery control support device according to claim 11,
wherein the one or more processors are further configured to:
receive a state of interconnection of point of the power system and the battery as the state information.

14. The battery control support device according to claim 11,
wherein the one or more processors are further configured to:
receive a state of interconnection of point of the power system and the battery as the state information, wherein the state of the power system is the state of the interconnection point.

15. The battery control support device according to claim 14,
wherein the one or more processors are further configured to:
transmit the operation control information, wherein the operation control information shows correlation between the state of the interconnection point and an adjustment target voltage of the power system.

16. The battery control support device according to claim 11,
wherein the one or more processors are further configured to:
detect a state of the power system; and generate operation control information based on the detected state of the power system.

\* \* \* \* \*